Aug. 7, 1945.   C. M. SAVRDA   2,381,560
FISH FILLETING MACHINE
Filed June 25, 1942   19 Sheets-Sheet 1

INVENTOR.
CHARLES M. SAVRDA
BY
ATTORNEY.

Aug. 7, 1945.   C. M. SAVRDA   2,381,560
FISH FILLETING MACHINE
Filed June 25, 1942   19 Sheets-Sheet 3

INVENTOR.
CHARLES M. SAVRDA
BY
ATTORNEY.

Aug. 7, 1945.  C. M. SAVRDA  2,381,560
FISH FILLETING MACHINE
Filed June 25, 1942  19 Sheets-Sheet 9

INVENTOR.
CHARLES M. SAVRDA
BY Wm. S. Pritchard
ATTORNEY.

Aug. 7, 1945.　　　C. M. SAVRDA　　　2,381,560
FISH FILLETING MACHINE
Filed June 25, 1942　　　19 Sheets-Sheet 10

INVENTOR.
CHARLES M. SAVRDA
BY
ATTORNEY.

Aug. 7, 1945.  C. M. SAVRDA  2,381,560
FISH FILLETING MACHINE
Filed June 25, 1942  19 Sheets-Sheet 14
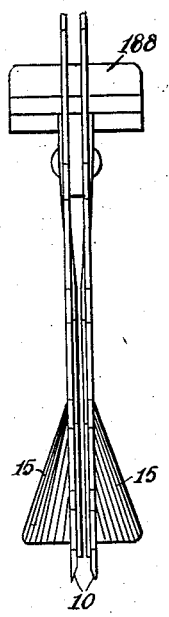
Fig.14.
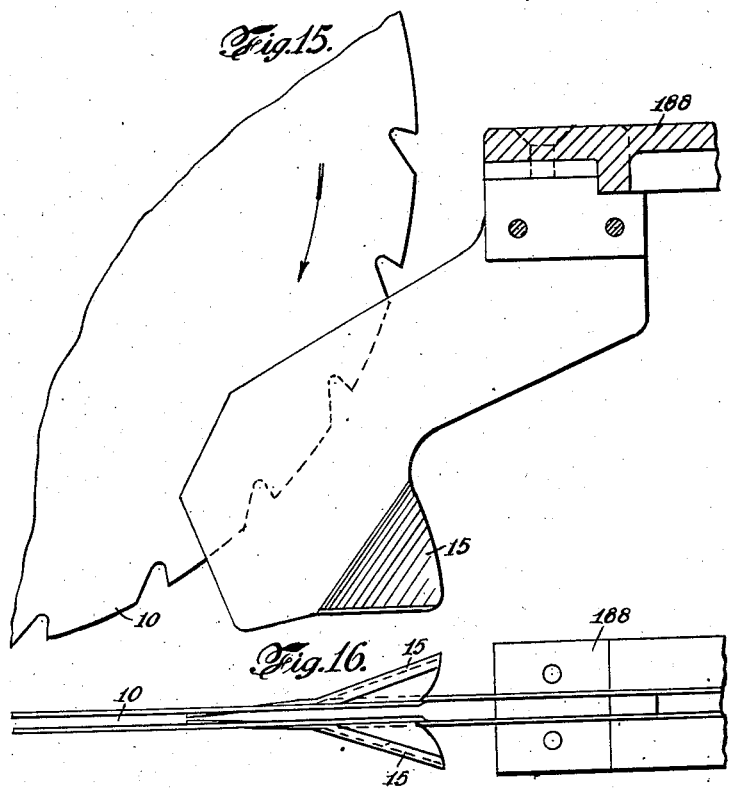
Fig.15.
Fig.16.
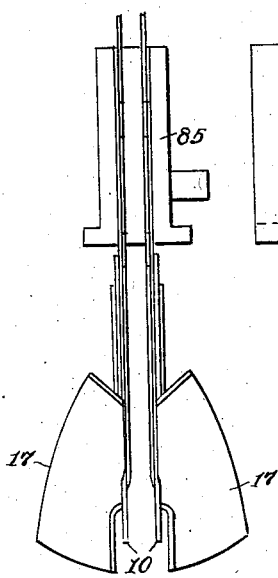
Fig.17.
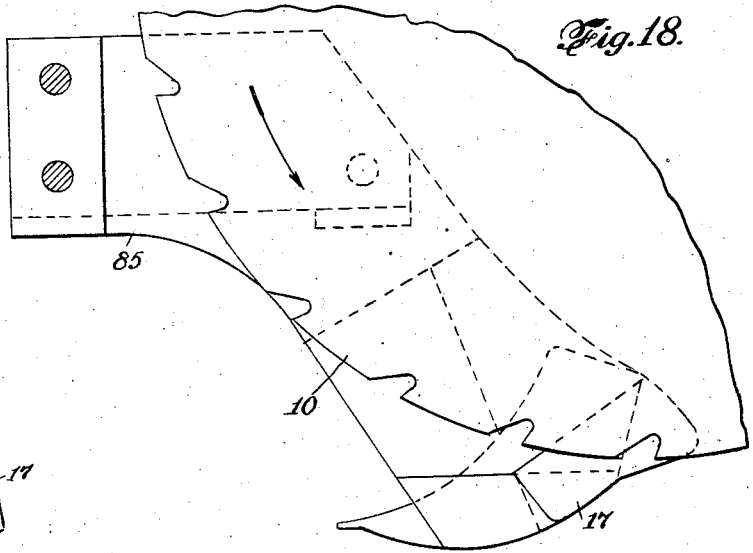
Fig.18.
INVENTOR.
CHARLES M. SAVRDA
BY WM. S. Pritchard
ATTORNEY.

Aug. 7, 1945.   C. M. SAVRDA   2,381,560
FISH FILLETING MACHINE
Filed June 25, 1942   19 Sheets-Sheet 15

INVENTOR.
CHARLES M. SAVRDA
BY
ATTORNEY.

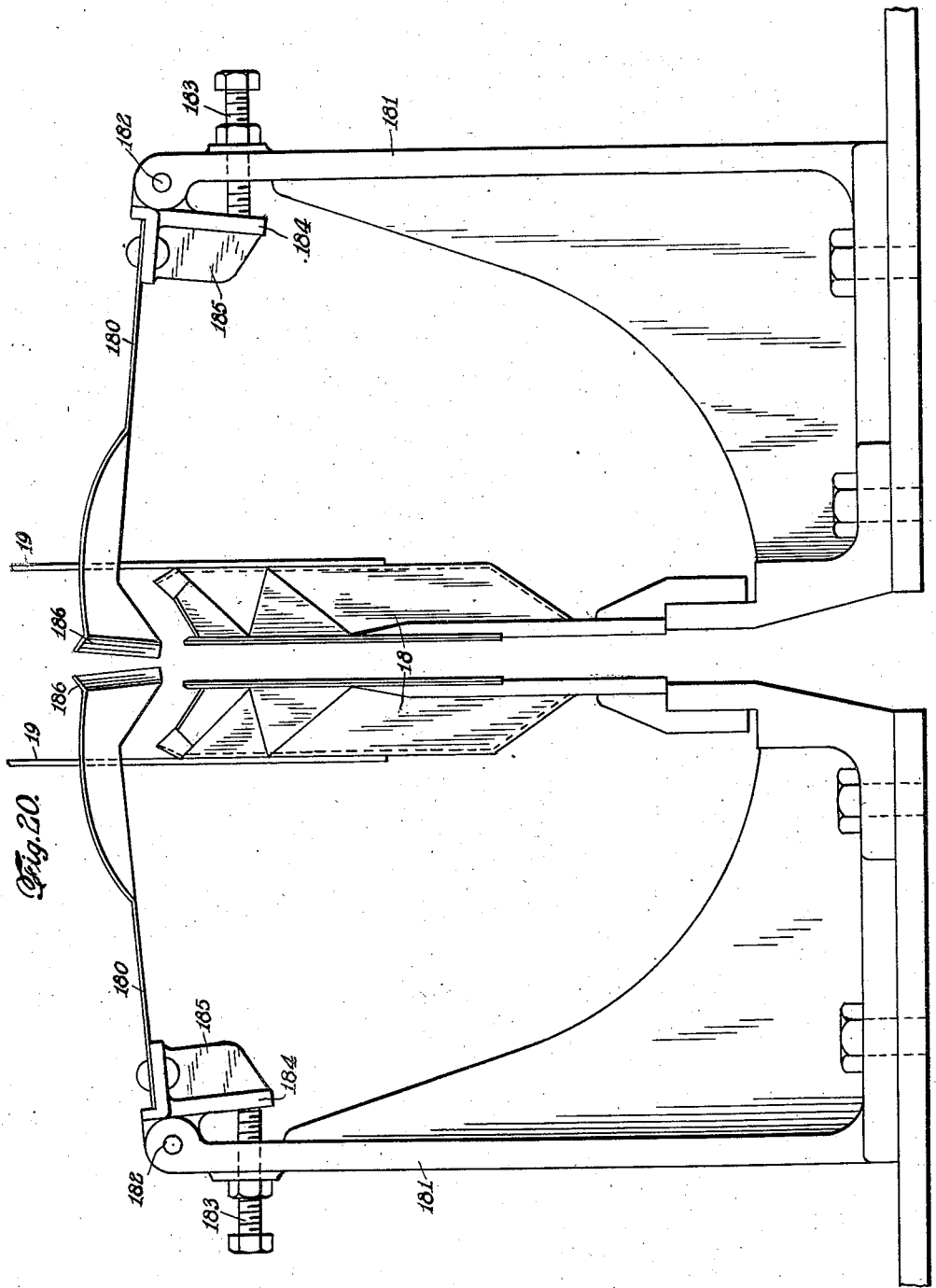

Aug. 7, 1945.  C. M. SAVRDA  2,381,560
FISH FILLETING MACHINE
Filed June 25, 1942  19 Sheets-Sheet 17
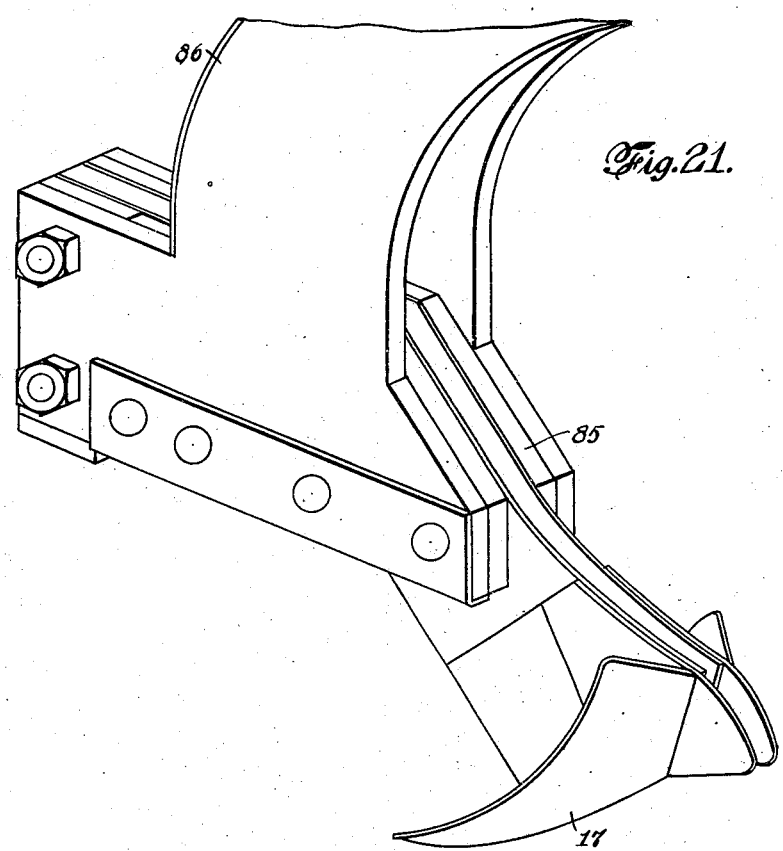
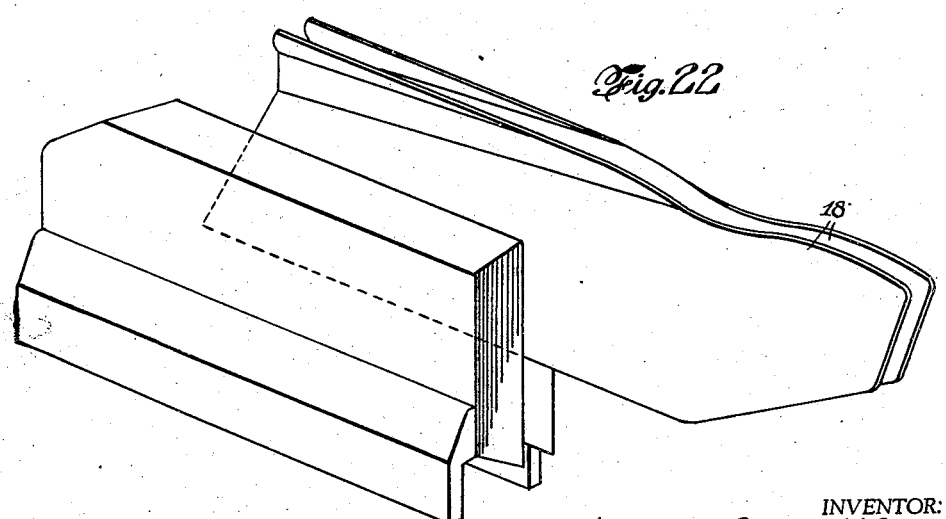
INVENTOR:
CHARLES M. SAVRDA
BY Wm. S. Pritchard
ATTORNEY.

Aug. 7, 1945.   C. M. SAVRDA   2,381,560
FISH FILLETING MACHINE
Filed June 25, 1942   19 Sheets-Sheet 18
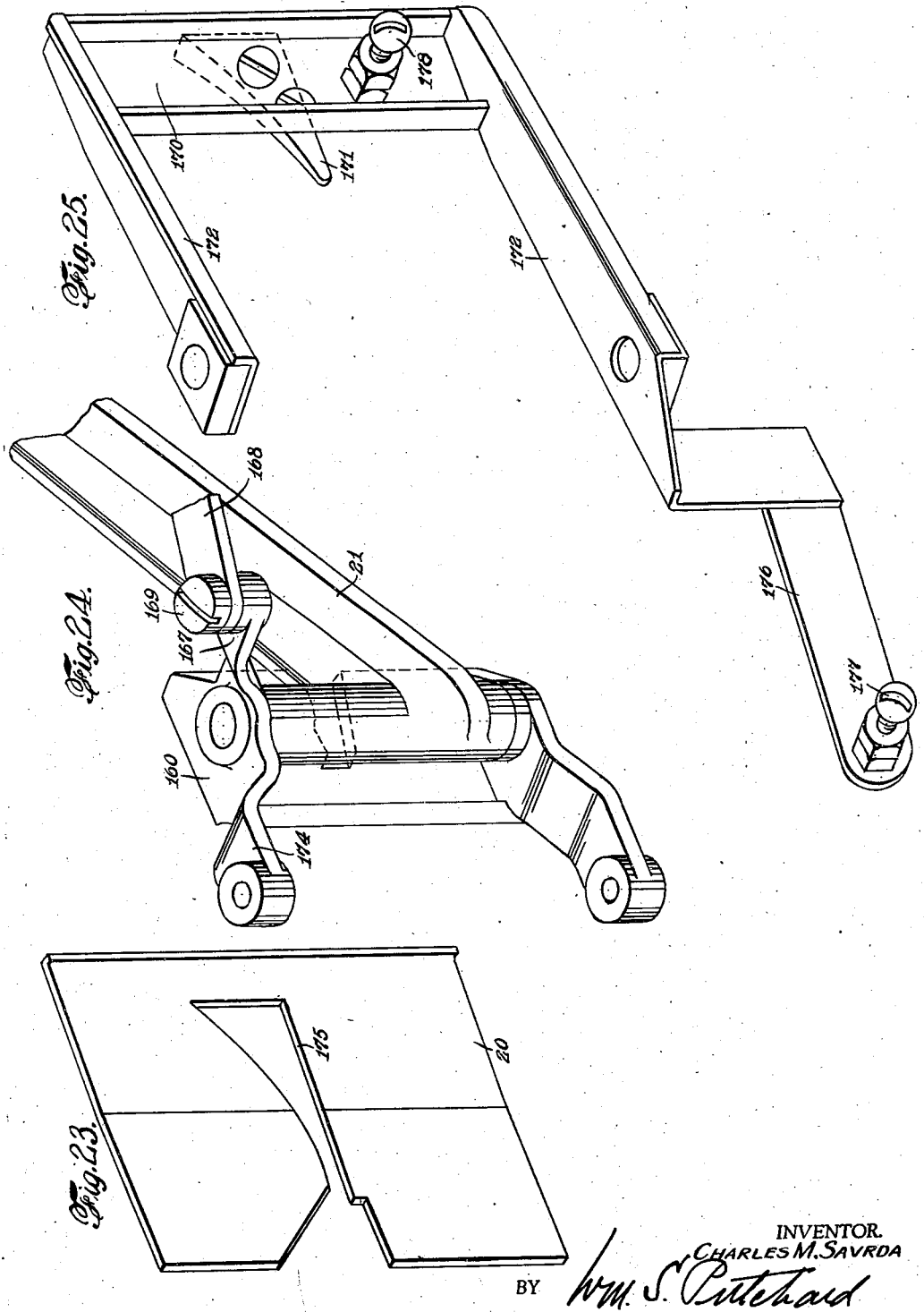
INVENTOR.
CHARLES M. SAVRDA
BY Wm. S. Pritchard
ATTORNEY.

Aug. 7, 1945.   C. M. SAVRDA   2,381,560
FISH FILLETING MACHINE
Filed June 25, 1942   19 Sheets—Sheet 19
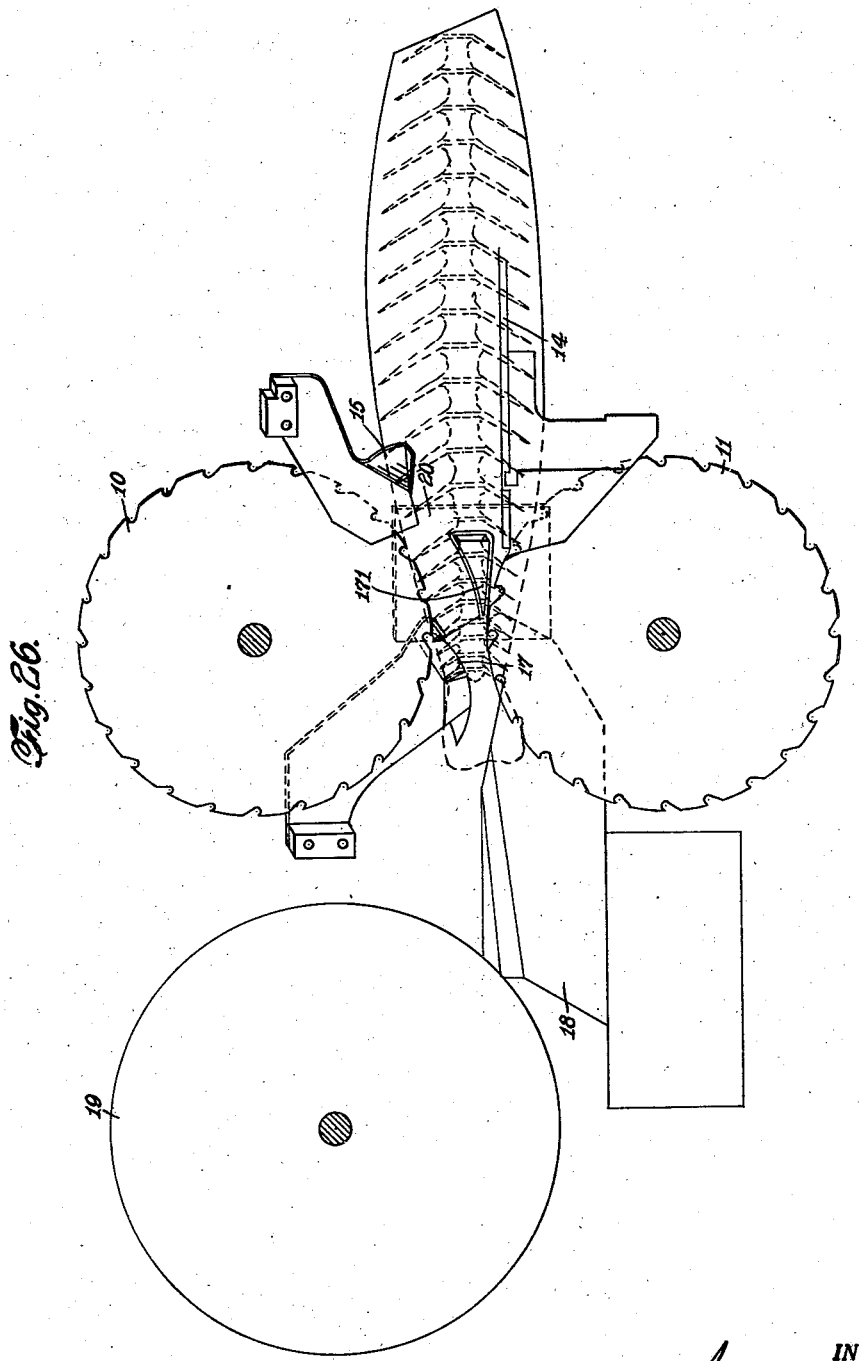
INVENTOR.
CHARLES M. SAVRDA
BY
ATTORNEY.

Patented Aug. 7, 1945

2,381,560

UNITED STATES PATENT OFFICE 2,381,560

FISH FILLETING MACHINE

Charles M. Savrda, Bay Shore, N. Y., assignor to The Atlantic Coast Fisheries Company, New York, N. Y., a corporation of Maine Application June 25, 1942, Serial No. 448,357

36 Claims. (Cl. 17—3)

This invention relates to a machine for filleting fish.

An object of the invention is to provide a fish-filleting machine having novel and improved details of construction and features of operation.

Another object is to provide a machine of the above type which is capable of cutting and removing the fillets, regardless of minor variations in fish sizes.

Another object is to provide a machine of the above type having novel and improved means for severing the fillets at the tail portion of the fish.

Another object is to provide a machine of the above type which is capable of cutting and removing fillets with a minimum amount of waste.

Various other objects and advantages will become apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings, in which a specific embodiment thereof has been shown for purposes of illustration.

In the drawings,

Figures 14, 15 and 16 are front, side and bottom views, respectively, of the tail comb, showing its relationship to the upper knives;

Figure 17 is a front elevation showing the relationship of the tail guide to the knives;

Figure 18 is a central vertical section taken on Figure 17;

Figure 20 is a detail view of the hold-down mechanism;

Figure 21 is a perspective view of the tail guide;

Figure 22 is a perspective view of the ribbing knives;

Figure 23 is a perspective view of the swivel guide;

Figure 24 is a perspective view of the supporting mechanism for the swivel guide;

Figure 25 is a perspective view of the auxiliary guide; and

Figure 26 is a longitudinal vertical section between the cutters showing the progress of a fish therethrough.

Figure 1:
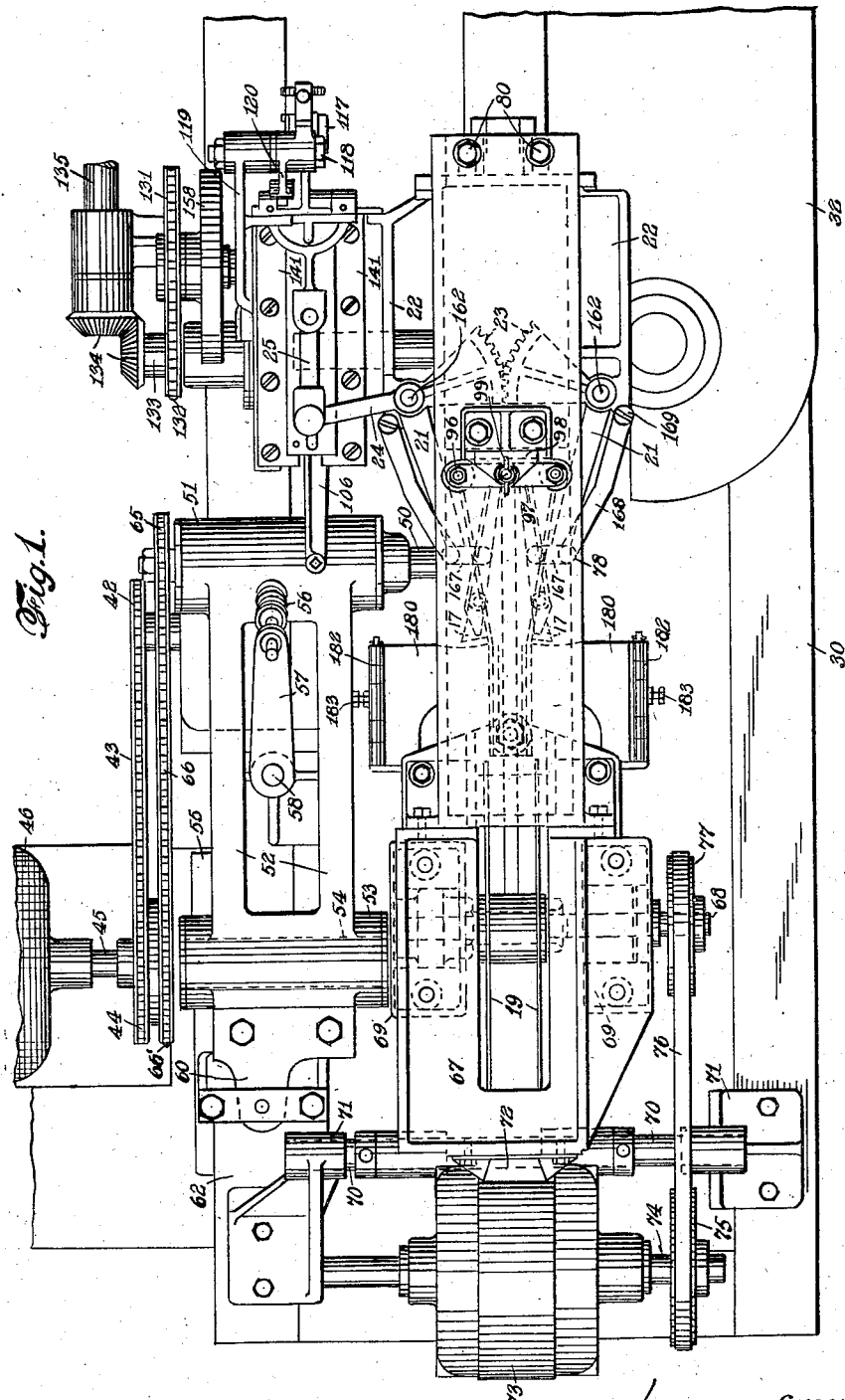
Figure 1 is a top plan view of a filleting machine embodying the present invention.

In filleting machines of the type to which the present invention relates, a decapitated and gutted fish is fed, preferably at high velocity, tail first and back downward, between upper and lower pairs of cutting knives which are adapted to make incisions on opposite sides of the backbone of the fish and which extend upwardly and downwardly but do not quite meet at the backbone.

Suitable feed means is provided for feeding the fish in the proper position to the cutting knives. Such a feed means may include a feed trough, centering trough, and tilting trough arranged in series and in alignment so that the fish is progressively fed therethrough, as set forth more in detail in the copending application of William H. Hunt, Serial No. 427,549, filed January 21, 1942, now U. S. Patent No. 2,325,680. The troughs, as set forth in that application, are adapted to position and center the fish so that the tail feather and fins pass between the pairs of cutting knives and thereby accurately guide the fish and prevent a cross-cut from being made which would destroy the fillet.

The cutting mechanism above referred to comprises two pairs of rotating knives, the lower knives being adapted to cut upwardly from the back of the fish on opposite sides of the backbone, and the upper knives being adapted to cut downwardly from the belly side of the fish in the same manner.

In making fillets, it is necessary, in addition to making cuts of the above nature, to remove the fillets from the ribs opposite the belly cavity of the fish. At the same time, the knives must be prevented from cutting through the ribs and severing the same from the backbone and thereby permitting them to remain in the fillet. In order to avoid this, the upper knives in the present machine are mounted about a floating axis so that they may be raised or lowered as required. Provision is made for holding the upper knives in their lower position closely adjacent the lower knives as the cutting begins at the tail of the fish. Before the ribs are reached, however, the upper knives are released and are raised a sufficient distance to provide clearance for the passage of the ribs.

The above-described mechanism would leave the fillets attached to the backbone by a thin web represented by the clearance between the cuts produced by the upper and lower knives. In order to avoid this and make a clean cut of the fillet from the backbone at the tail portion of the fish, a movable tail guide is provided which is adapted to press the tail portion of the fish downwardly against the lower knives, thereby causing the lower knives to make incisions which substantially meet the incisions made by the upper knives to completely sever the flesh from the backbone at this point. In order to prevent the ribs from being cut by the lower knives, however, provision is made for releasing the tail guide and moving the same upwardly out of the path of the fish before the rib section is reached. In practice, the tail guide may be released at about the time that the upper knives are released. In this way, a clean cut is made at the tail portion of the fish and as the ribs and belly cavity are reached, the knives and tail guide are released so that the back incisions extend the entire length of the fish without severing the ribs.

For removing the fillets from the ribs, a pair of ribbing knives are provided which enter beneath the flesh in the incisions made by the lower knives and pull the flesh outwardly to thereby peel the fillets from the ribs. This operation normally removes the fillets and permits the same to drop into suitable receptacles while the skeleton, together with the tail feather and fins, passes on to discard. It sometimes happens, however, that the fillet may adhere to the skeleton at certain points and may thus be drawn along with the skeleton instead of dropping into the fillet receptacle. In order to prevent this, a pair of cut-off knives are provided which are spaced apart sufficiently to permit the skeleton to pass therebetween and are inoperative if the fillet has been completely removed. However, if the fillet should be drawn along with the skeleton, these final cut-off knives complete the severance.

A feature of the present invention comprises positioning means for feeding and positioning the fish as it passes between the knives and for releasing the tail guide and upper knives at the proper time to avoid severance of the ribs. This mechanism comprises a pair of swivel guides which are mounted for substantial parallel spreading movement as the fish passes therebetween. The guides are interconnected for movement in unison and control a latch which serves to release the tail guide and upper knives when the swivel guides have been forced apart a distance corresponding to the thickness of the fish at the belly cavity. The mechanism also provides compensating means which serves to release the latch at a predetermined time even though the fish passing between the swivel guides is too small to separate the latter to the point where the latch would normally be released before the ribs are reached. This mechanism is timed with respect to the travel of the fish so that, regardless of the size of the fish which is passing through the machine, within of course its operating limits, the latch is always released before severance of the ribs can occur.

The upper knives and tail guide are re-set by a cam mechanism which is timed with respect to the travel of the fish, so as to re-set the same prior to the passage of each fish.

Various other features of the invention consist in the details of construction and method of operation hereinafter more fully described.

Figure 7:
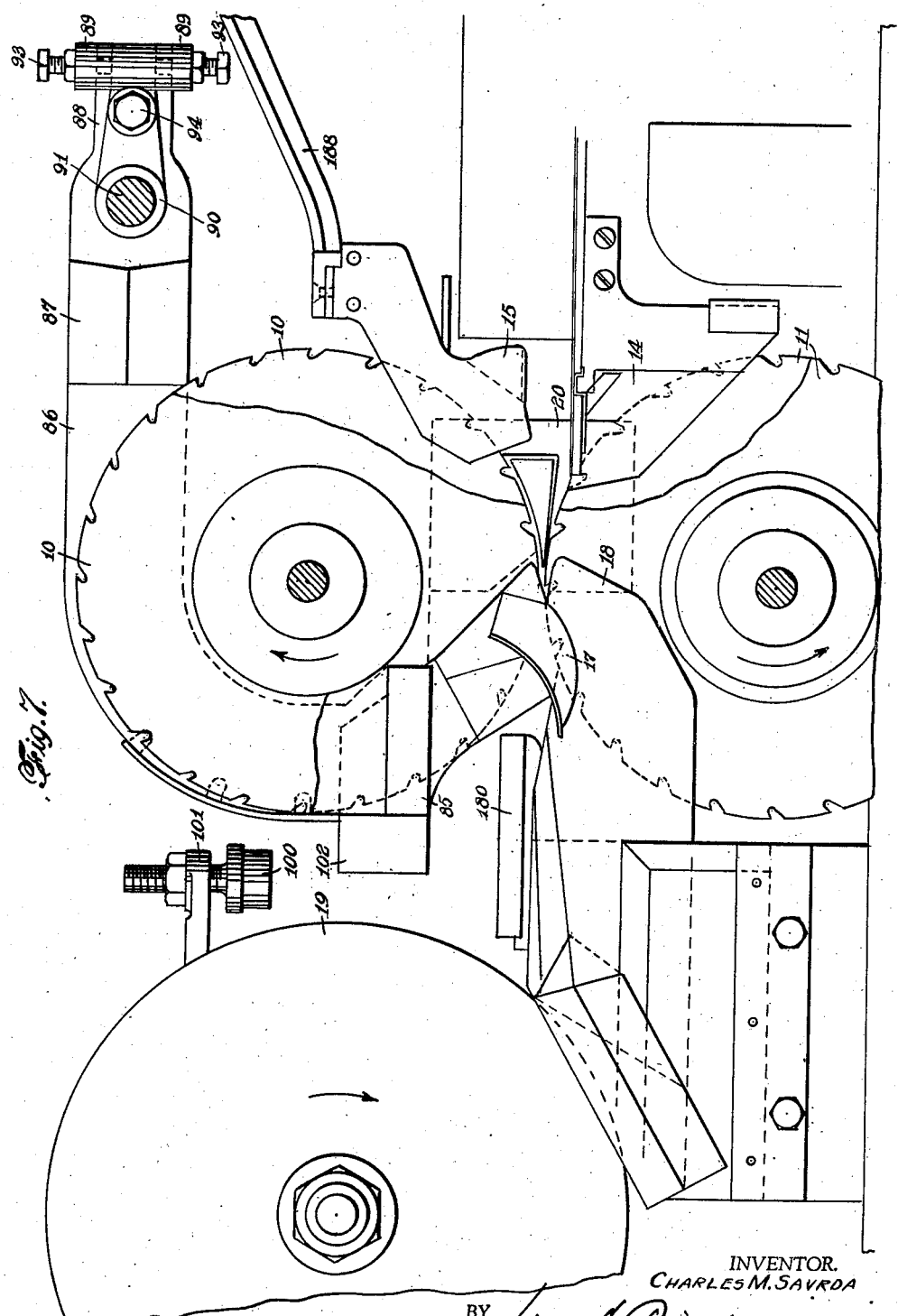
Figure 7 is a detail view showing the arrangement of the comb, upper and lower cutting knives, tail guide, ribbing knives and final cut-off knives, taken on the line 7—7 of Figure 6.

The general arrangement of the elements in the present machine may be best understood by referring to Figure 7, which shows a pair of upper knives 10 and a pair of lower knives 11, arranged to receive the fish from the end of the tilting trough 14, which is shown more in detail in the U. S. Patent No. 2,325,680 above referred to. A pair of combs 15 cooperate with the end of the tilting trough 14 to guide the tail feather and pelvic fins of the fish between and out of the path of the knives 10 and 11. The tail guide 17 is positioned to press the fish downwardly against the lower knives, as above described, and the ribbing knives 18 extend outwardly from the lower knives 11 in a position to enter the incisions made by the lower knives and strip the fillet from the ribs, as above mentioned. The final cut-off knives are shown at 19 in a position to engage and cut any fillet which may remain attached to the skeleton.

Figure 2:
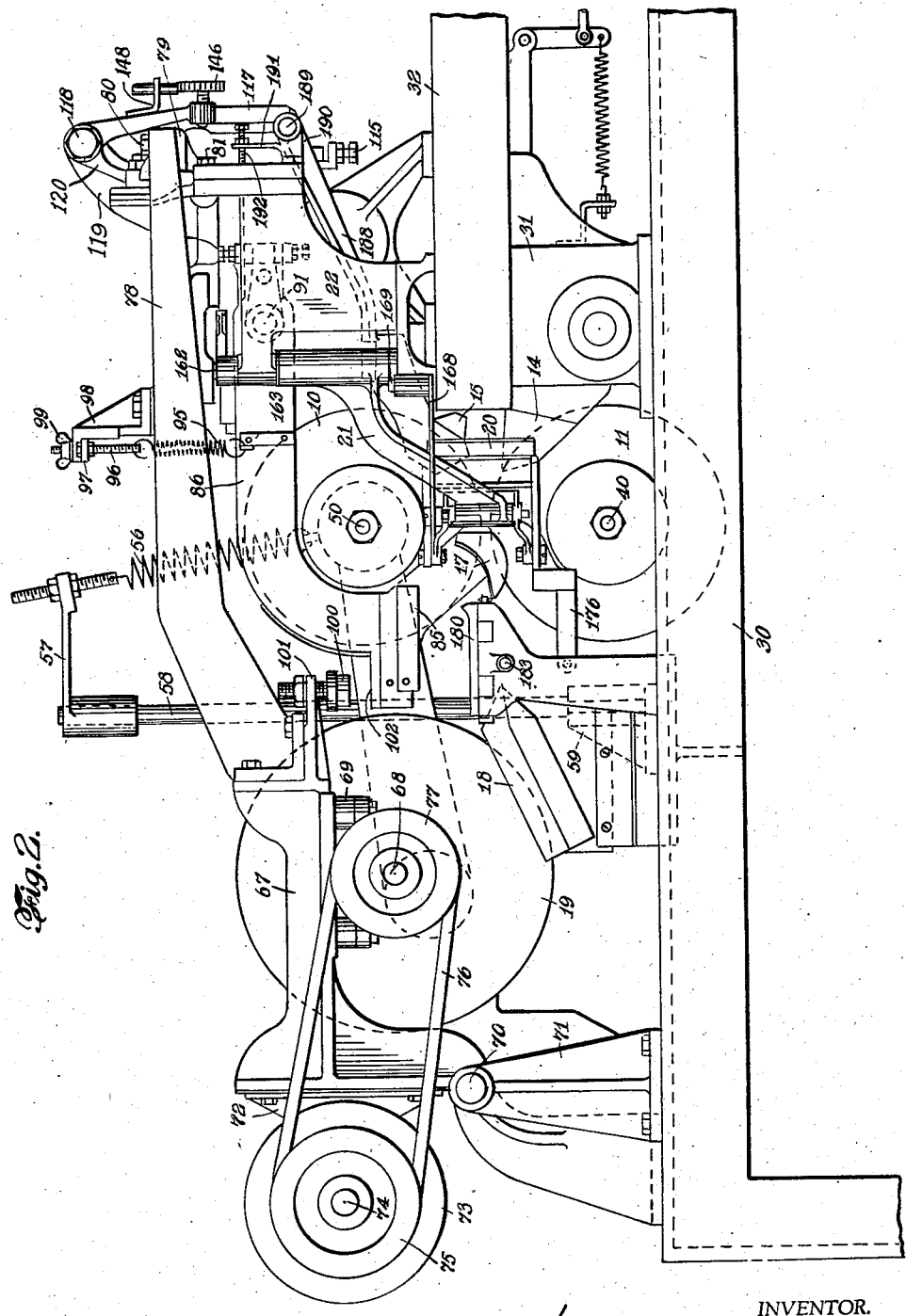
Figure 2 is a side elevation thereof showing the left side of the machine as viewed from the feed end.

The swivel guide mechanism for releasing the tail guide and upper knives is shown in Figure 2 as comprising guide plates 20 mounted, by suitable mechanism to be described, upon arms 21 which are pivoted in a casting 22. The guide plates 20 are positioned adjacent the cutting position and on the outside of the knives 10 and 11 and are adapted to be swung outwardly about the pivot axes of the arms 21 as a fish passes the cutting position. The arms 21 associated with the guide plates 20 on opposite sides of the cutting knives actuate gear segments 23 (Figure 1) which are adapted to cause the arms to operate in unison, so that the fish will always remain centered. One of the segments 23 has attached thereto an arm 24 actuating a slide mechanism 25, which is adapted to release the tail guide and upper knives in a manner to be described.

Referring now to Figure 2, it will be noted that the machine comprises a base 30 having at its right-hand end a bracket 31 supporting a conveyor frame 32 in which the tilting trough 14 is mounted by suitable means (not shown) and is adapted to feed the fish to the cutting knives. The frame 32 supports the casting 22 which carries the arms 21 and the slide mechanism 25.

Figure 5:
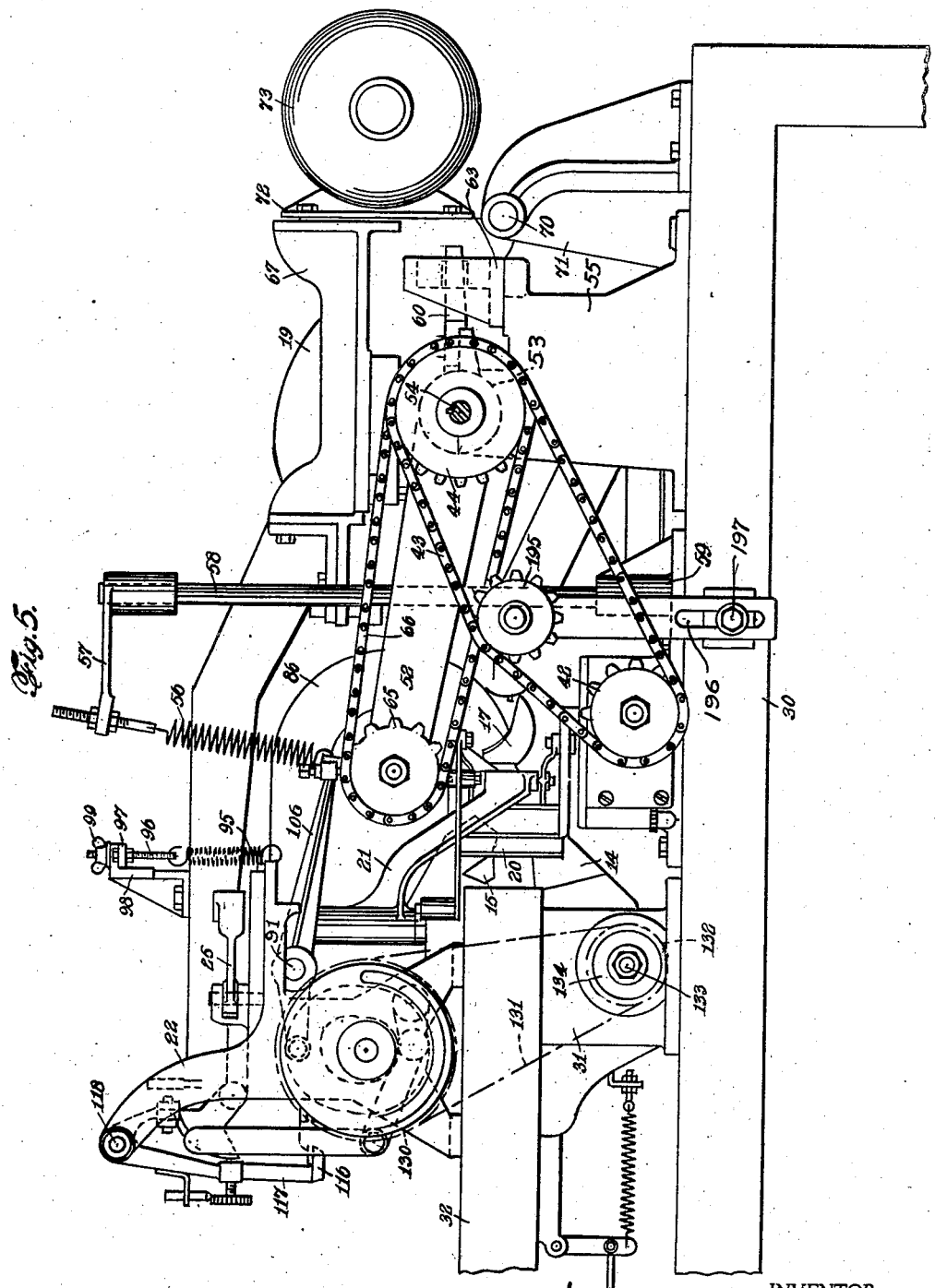
Figure 5 is a side elevation showing the right side of the machine as viewed from the feed end.
Figure 6:
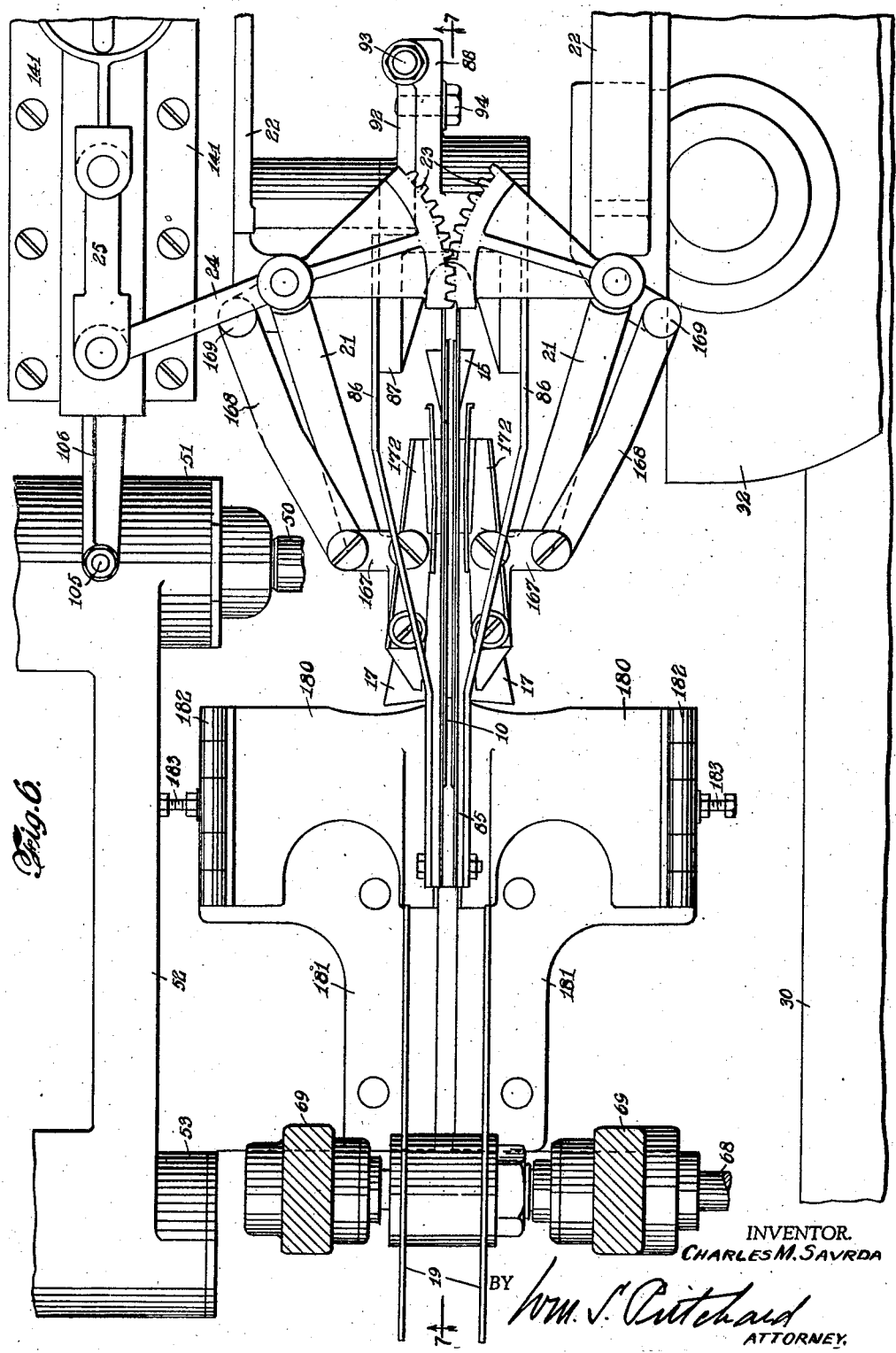
Figure 6 is a detail view showing the swivel guide mechanism.

The lower knives 11 are mounted on a shaft 40 (Figure 3) which is connected by a suitable reversing gear in a gear box 41 to a sprocket 42, which is driven by a belt or chain 43 from a sprocket 44 attached to the shaft 45 of the driving motor 46. The driving motor 46 is mounted on the base 30 in any suitable manner. A take-up device may be provided for the chain 43, which is shown in Figure 5 as comprising an idler sprocket 195 mounted on an adjustable rod 196 which is adjustably attached to the frame by a bolt 197. The cutting portion of the lower knives is preferably thin in section and formed with parallel sides to eliminate any tendency of the same to push the fish upwardly.

The upper knives 10 are mounted on a shaft 50 (Figures 1 and 3) which is journalled in a bracket 51 having a pair of arms 52 attached to a hub 53. The hub 53 is mounted on a shaft 54 (Figures 1, 4 and 5) held in a bracket 55 (Figure 4) which is attached to the base 30. A spring 56 (Figure 5) is attached between the bracket 51 and a stationary bracket 57 mounted on a rod 58 attached to a boss 59 in the base 30, and normally urges upwardly the bracket 51 and the knives 10 which are carried thereby. The hub 53 carries a short arm 60 which passes through an opening in the bracket 55 and is limited in its vertical movement therein by any convenient means 63.

Figure 3:
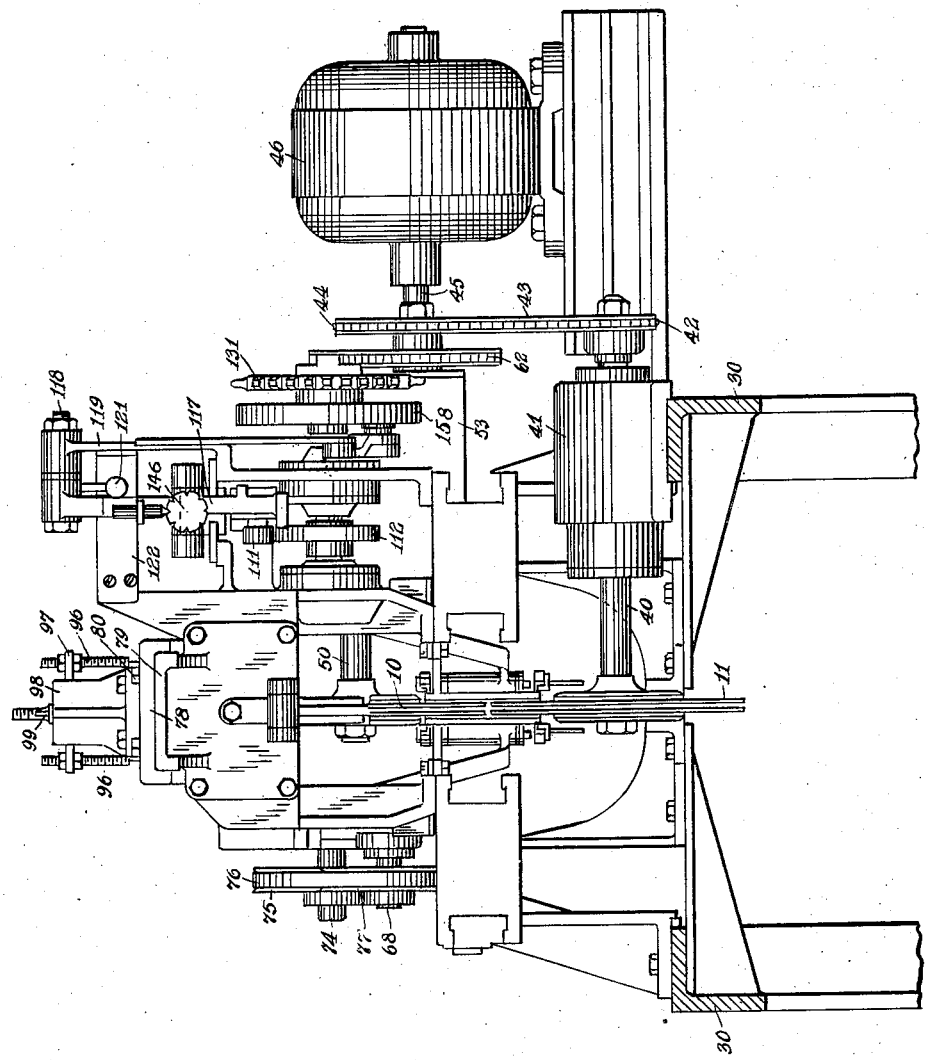
Figure 3 is an end elevation taken from the feed end of the machine.
Figure 4:
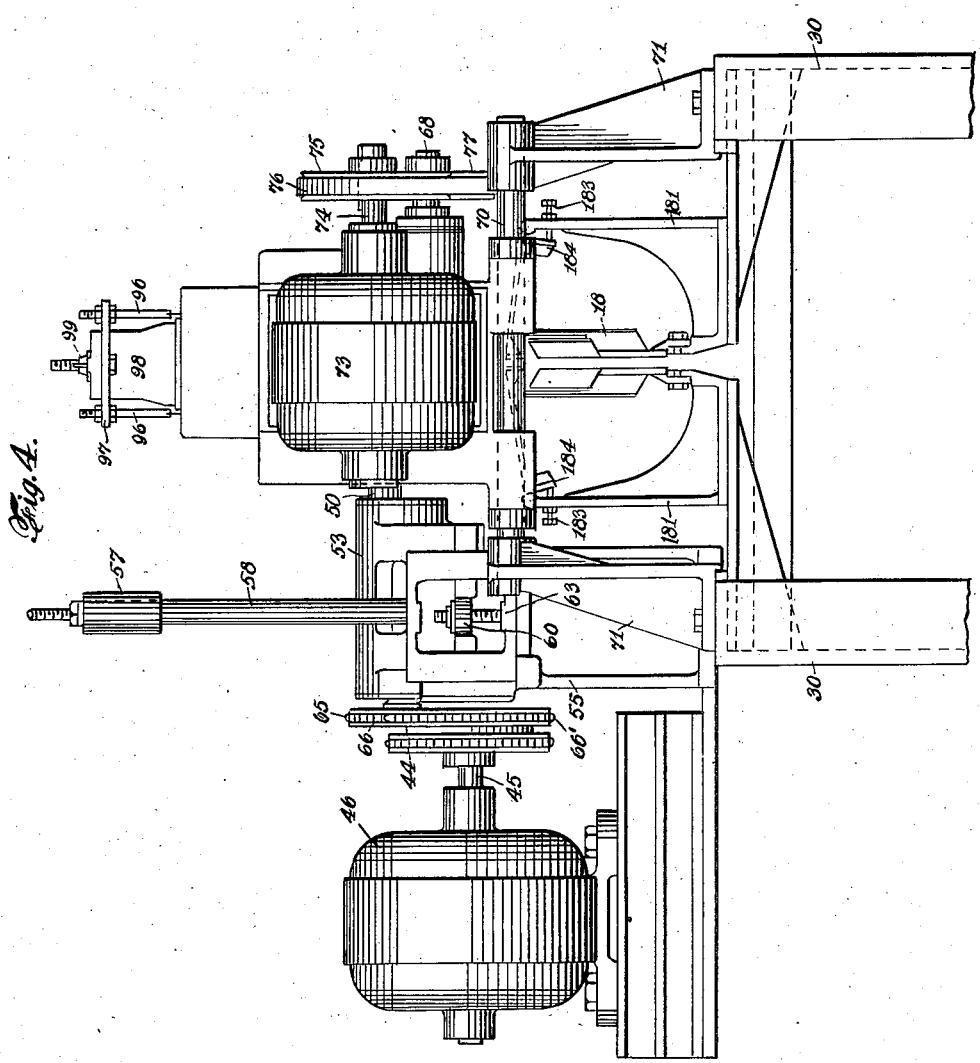
Figure 4 is an end elevation taken from the delivery end of the machine.

The shaft 50 carries a sprocket 65 (Figure 1) driven by a belt or chain 66 from a sprocket 66' attached to the shaft 45 of the motor 46 (Figures 1 and 3). The shaft 45 is mounted axially of the hub 53 so that the drive for the upper knives 10 is not affected by pivotal movement of the bracket 51 about the shaft 54.

The final cut-off knives 19 (Figures 1, 2 and 7) are mounted on a shaft 68 which is journalled in brackets 69 attached to a bifurcated arm 67. The arm 67 is journalled for movement about a pin 70 carried in brackets 71 attached to the base 30. The arm 67 also carries a bracket 72 to which a motor 73 is attached. The motor 73 is provided with a shaft 74 carrying a sheave 75 which drives, by means of a V-belt 76, a sheave 77 attached to the shaft 68.

The arm 67 carries an extension 78 (Figure 2) which is attached to a bracket 79 by bolts 80. The bracket 79 is attached to the fixed casting 22 by bolts 81. The arrangement is such that by releasing the bolts 80, the arm 67, together with the motor 73 and the cut-off knives 19, may be swung upwardly about the pin 70 so as to expose the knives 10 and 11 and other operating mechanism for inspection, repair or adjustment.

Figure 8:
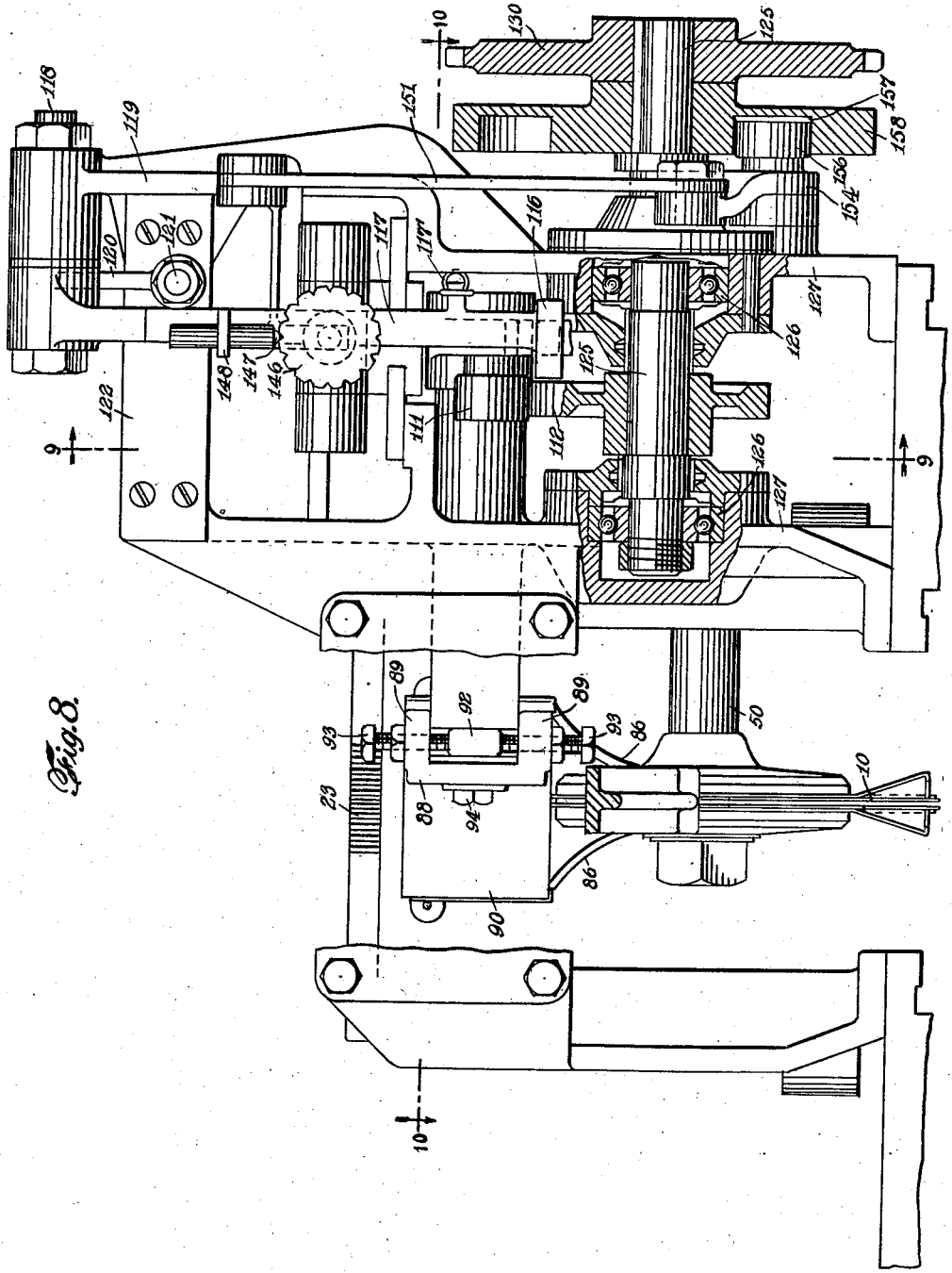
Figure 8 is an end elevation, certain parts being shown in section and showing the drive for the tail guide-operating mechanism.
Figure 10:
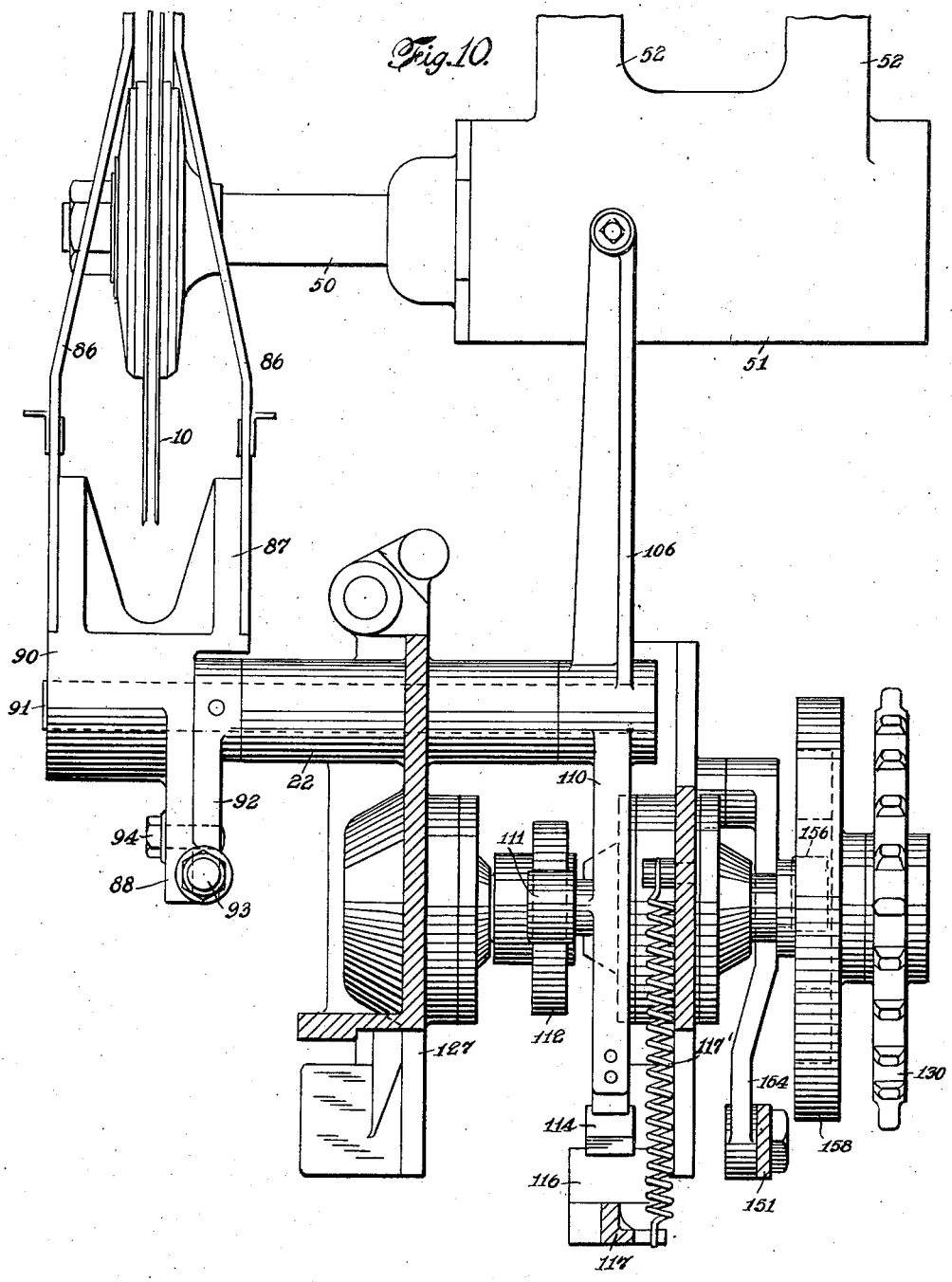
Figure 10 is a detail plan view of the actuating mechanism for the tail guide and upper knives, taken on the line 10—10 of Figure 8.

The tail guide 17 (Figures 2, 7, 11, 13, 17, 18 and 21) is mounted on a bracket 85 which is attached to curved arms 86. The arms 86 are attached to a casting 87 (Figures 7, 8 and 10) having a bracket 88 provided with upper and lower lips 89. A sleeve 90 carries the casting 87 and is pinned to a shaft 91 journalled in the casting 22. The sleeve 90 carries an arm 92 which extends along the bracket 88 and is engaged by adjusting screws 93 carried in the lips 89 of said bracket 88. The arm 92 may be clamped in adjusted position by a set screw 94. The arms 86 are normally held in a raised position by means of springs 95 (Figures 2 and 5) attached to pins 96 carried in a bar 97 which is adjustably supported in a bracket 98 and is secured by a wing nut 99. The bracket 98 is mounted on the arm 78. An adjustable stop 100, carried in a bracket 101 attached to the arm 67, engages a shoulder 102 on the bracket 85 to limit the upward movement of the tail guide 17.

The upper knives 10 are held downwardly by means of a bolt 105 carried in an arm 106 (Figure 9) which is attached to the shaft 91. The bolt 105 rests against the bracket 51 for the above purpose. In this way, the tail guide 17 and the upper knives 10 are actuated in unison by the rocking movement of the shaft 91, to be described.

Figure 9:
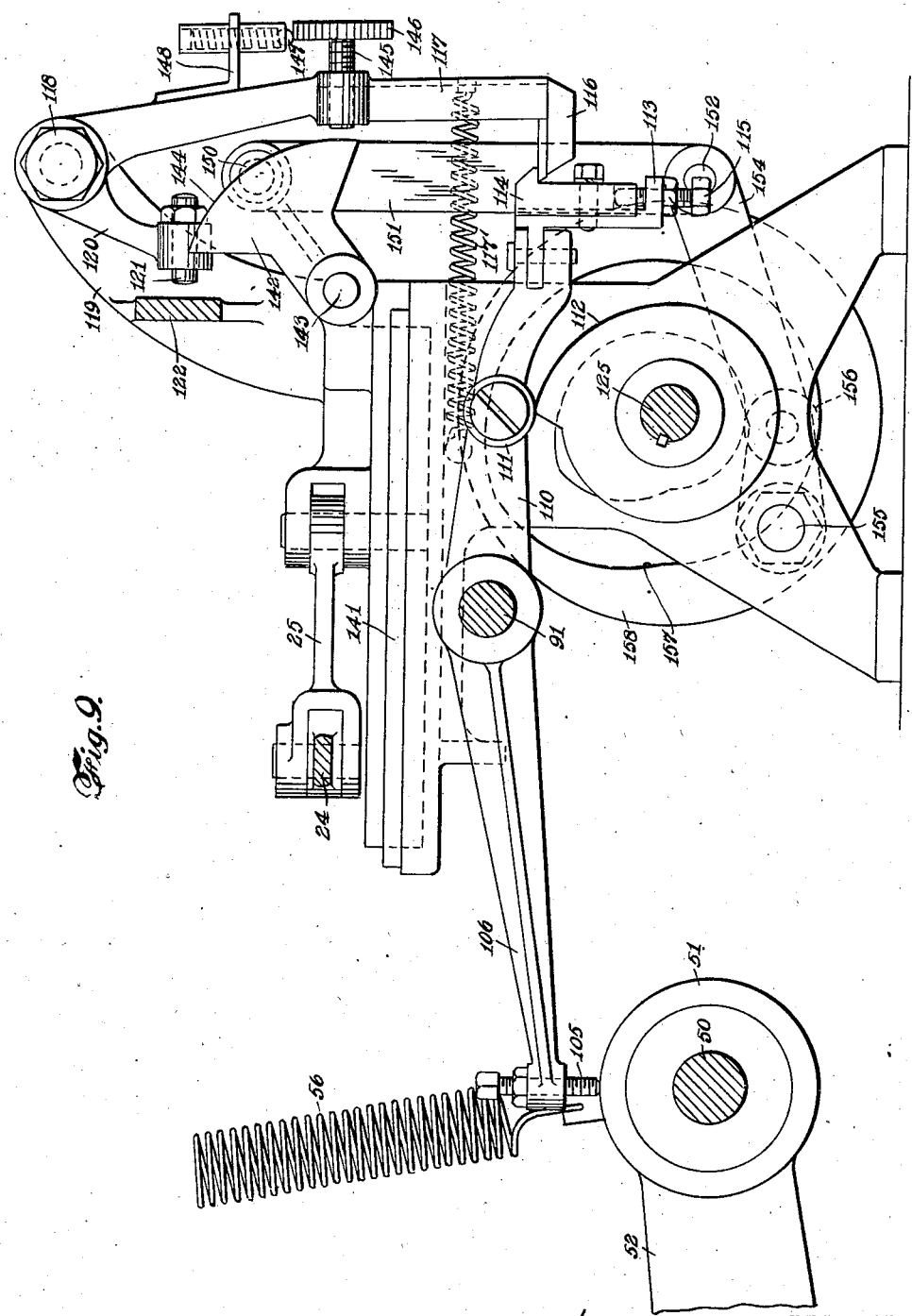
Figure 9 is a detail sectional view showing the release for the tail guide and upper knives, taken on the line 9—9 of Figure 8.

The shaft 91 is actuated by an arm 110 which is formed as a rearward extension of the arm 106. The arm 110 carries a roller 111 (Figures 9 and 10) which engages the surface of a cam 112 and is actuated thereby. The arm 110 carries at its end a bracket 113 (Figure 9) in which a latch 114 is adjustably held by means of a bolt 115. The latch 114 is adapted to engage a pawl 116 carried by an arm 117 and is held in engagement with the latch by a spring 117'. Arm 117 is pivoted on a pin 118 (Figures 1 and 9) mounted in a bracket 119 attached to the casting 22. A short arm 120 is attached to the arm 117 and carries an adjustable stop 121 which engages a shoulder 122 formed on the bracket 119 to limit the movement of the pawl 116. The arrangement is such that, when the pawl 116 is moved rearwardly (as shown in Figure 9) to release the latch 114, the arms 106 and 110 are shifted in a clockwise direction by means of the springs 95. The arms 106 and 110, together with the tail guide, are restored, however, by the action of the cam 112.

The cam 112 is mounted on a shaft 125 journalled in bearings 126 carried in brackets 127 on the casting 22. The shaft 125 is driven by a sprocket 130 actuated by a chain 131 (Figure 5) from a drive sprocket 132 mounted on a shaft 133 (Figures 1 and 5). The shaft 133 is driven by beveled gears 134 (Figure 1) from a main drive shaft 135, which is driven by a suitable means, such as a motor (not shown), in synchronism with the movement of the conveyors, so that the sprocket 130 makes a complete revolution during the feed of each fish to the knives by the conveyor. The cam 112 (Figure 9) is thus caused to rotate in synchronism with the feed of the fish and is timed to restore the arm 110 to latching position before each fish reaches the knives and to release the arm shortly thereafter, so that the arm is then free to move when released by the latch 114.

The pawl 116 which releases the latch 114 is actuated by the slide mechanism 25 (Figures 1 and 9) which reciprocates between the guides 141 and carries at its end a pin 143 about which a cam segment 142 is pivoted for vertical movement. The cam segment 142 is provided with a cam surface 144 which is adapted to bear against an adjustable screw 145, carried in the arm 117, and provided with a knurled hand wheel 146 by which adjustment may be effected. A spring-actuated detent 147 mounted on a bracket 148 attached to the arm 117 holds the screw 145 in adjusted position. The cam surface 144 is arranged to progressively force the arm 117 outwardly as the segment 142 moves downwardly.

The segment 142 carries a pin 150 to which a link 151 is attached. The link 151 is pinned, as by a pin 152, to an arm 154 which is pivoted at 155 to the casting 22 and carries a roller 156 which is engaged by a cam groove 157 (Figure 8) in a cam wheel 158 attached to the shaft 125. The cam groove 157 is so arranged with respect to the cam 112 as to move the segment 142 downwardly from the position shown in Figure 9 during the time while the tail portion of the fish is being engaged by the cutting knives. The slide 25 is actuated during the passage of the fish through the cutting station by means of the guide plates 20 to be described.

The pair of guide plates 20 are mounted in a position to engage the sides of the fish as the same reaches the cutting station. Each guide plate 20 is mounted on a bracket 160 (Figures 2, 12, 23, 24) which is pivotally mounted by means of a pin 161 (Figures 1 and 11) on the arm 21 (Figure 2). The arm 21 is attached to a pin 162, which is held in a bracket 163 attached to the casting 22. The pin 162 carries the segmental gear 23, above mentioned. The pair of plates 20 and arms 21 are arranged so that the gears 23 are in mesh and cause the arms to move in unison. Hence the fish passing therebetween always remains centered. One of the segmental gears 23 has attached thereto the arm 24 pivoted to the slide mechanism 25 so that the slide mechanism 25 is moved to the right (as shown in Figure 1) an amount proportional to the spreading apart of the plates 20 as the fish passes therebetween.

Each bracket 160 (Figure 24) carries an extension 167, to which a link 168 is pivotally mounted. The link 168 is pivoted on the casting 22 about a stud 169. The link 168 and the arm 21 (Figure 1) cause the plate 20 to have a substantial parallel movement as they are forced outwardly by the fish.

An auxiliary guide plate 170 (Figure 25) carrying a tail feather guide 171 is mounted on arms 172, which are pivoted by a pin 173 (Figure 12) to an extension 174 (Figure 24) of the bracket 160 which carries each plate 20. The plates 20 are provided with recesses 175 (Figure 23) through which the tail feather guides 171 extend. The tail feather guides are normally held inwardly by means of leaf springs 176 which are attached to the lower arms 172 and are provided with adjusting screws 177 which bear against the frame of the machine.

Adjusting screws 178, carried by the auxiliary guide plates 170, are adapted to bear against the guide plates 20 to form a stop to limit the inner position of the tail feather guide 171.

Figure 11:
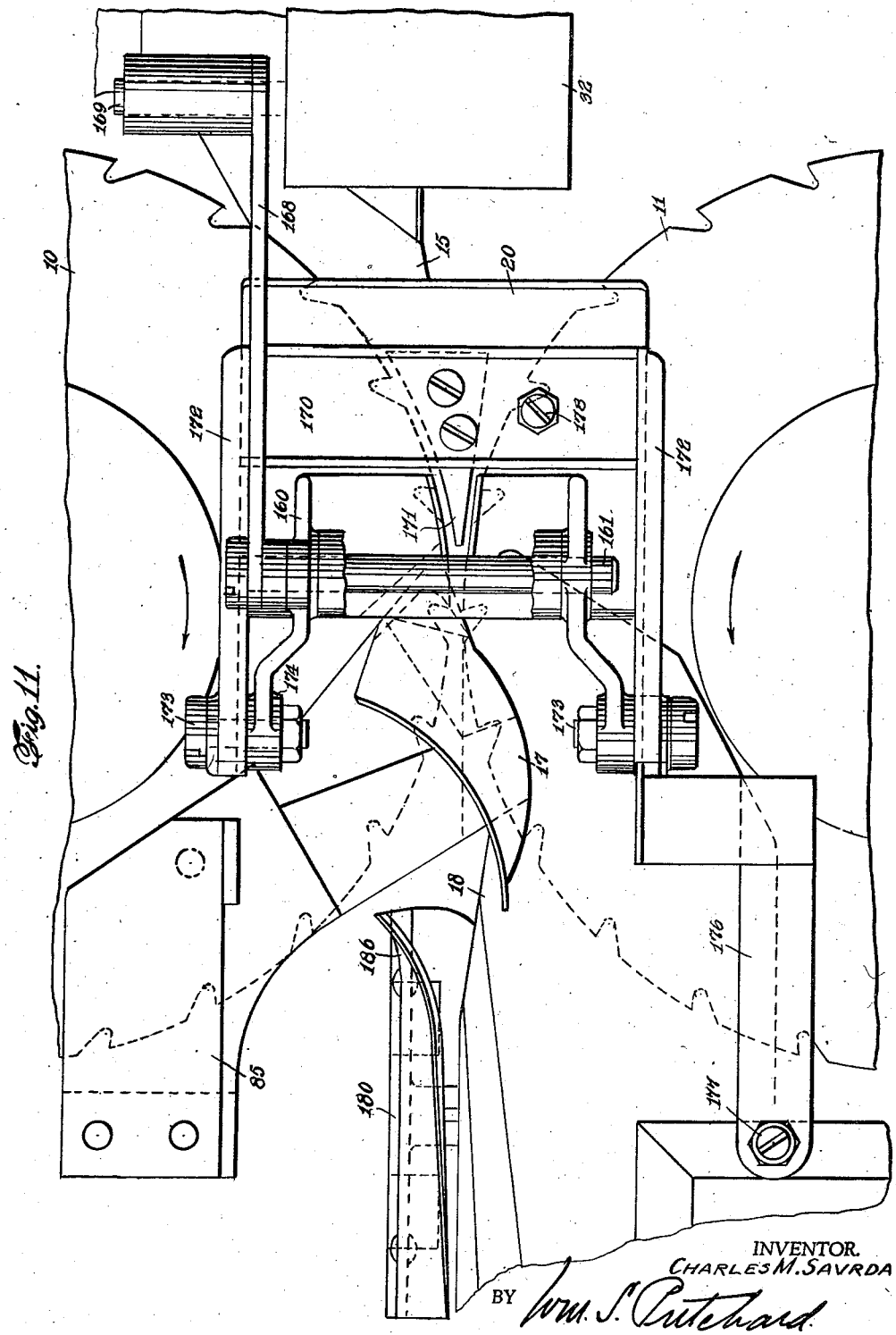
Figure 11 is an enlarged detail view showing the arrangement of the swivel guide and tail guide.
Figure 12:
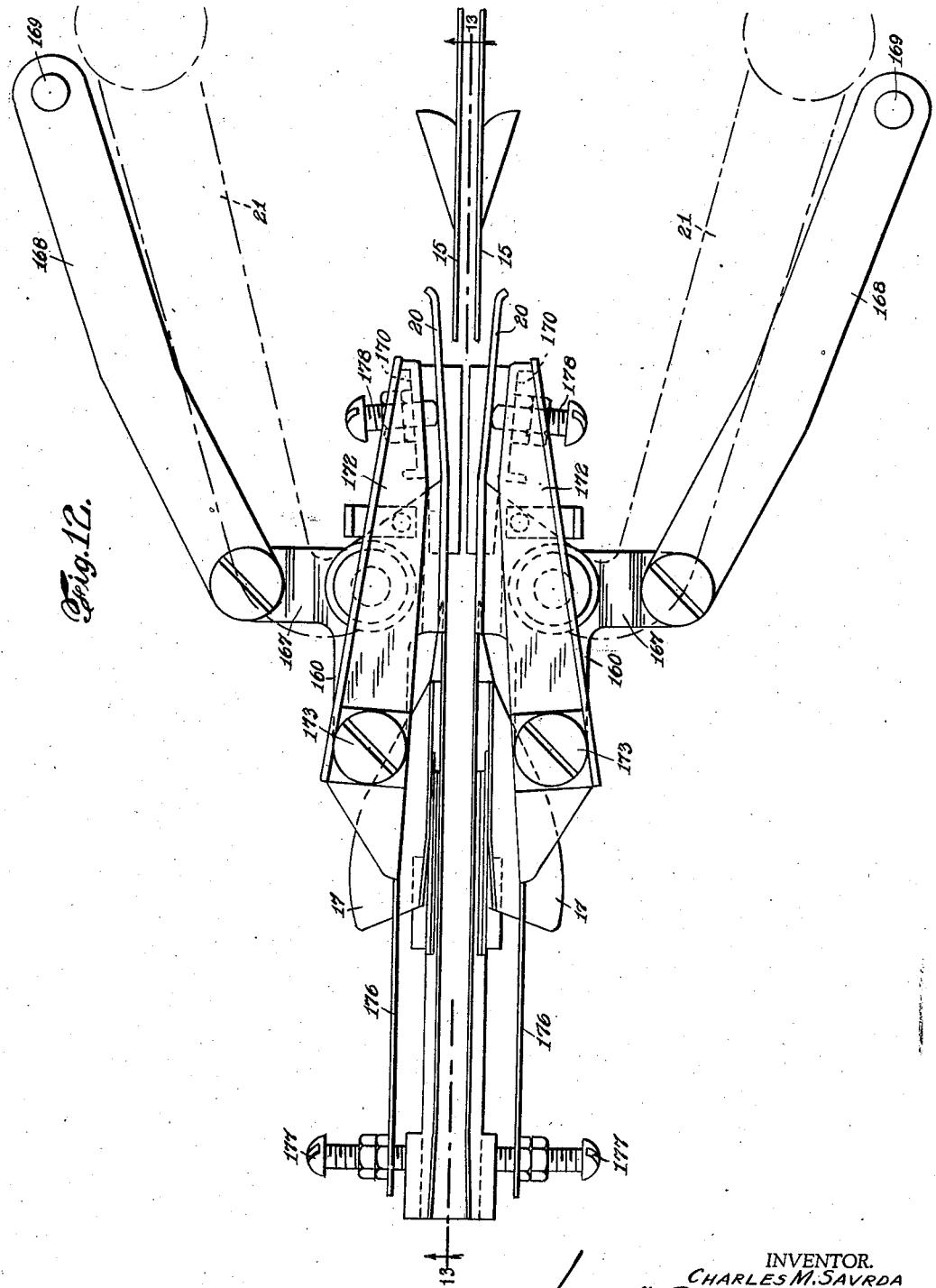
Figures 12 and 13 are detail views of the swivel guide and supporting mechanism therefor, the latter being a section taken on the line 13—13 of Figure 12.
Figure 13:
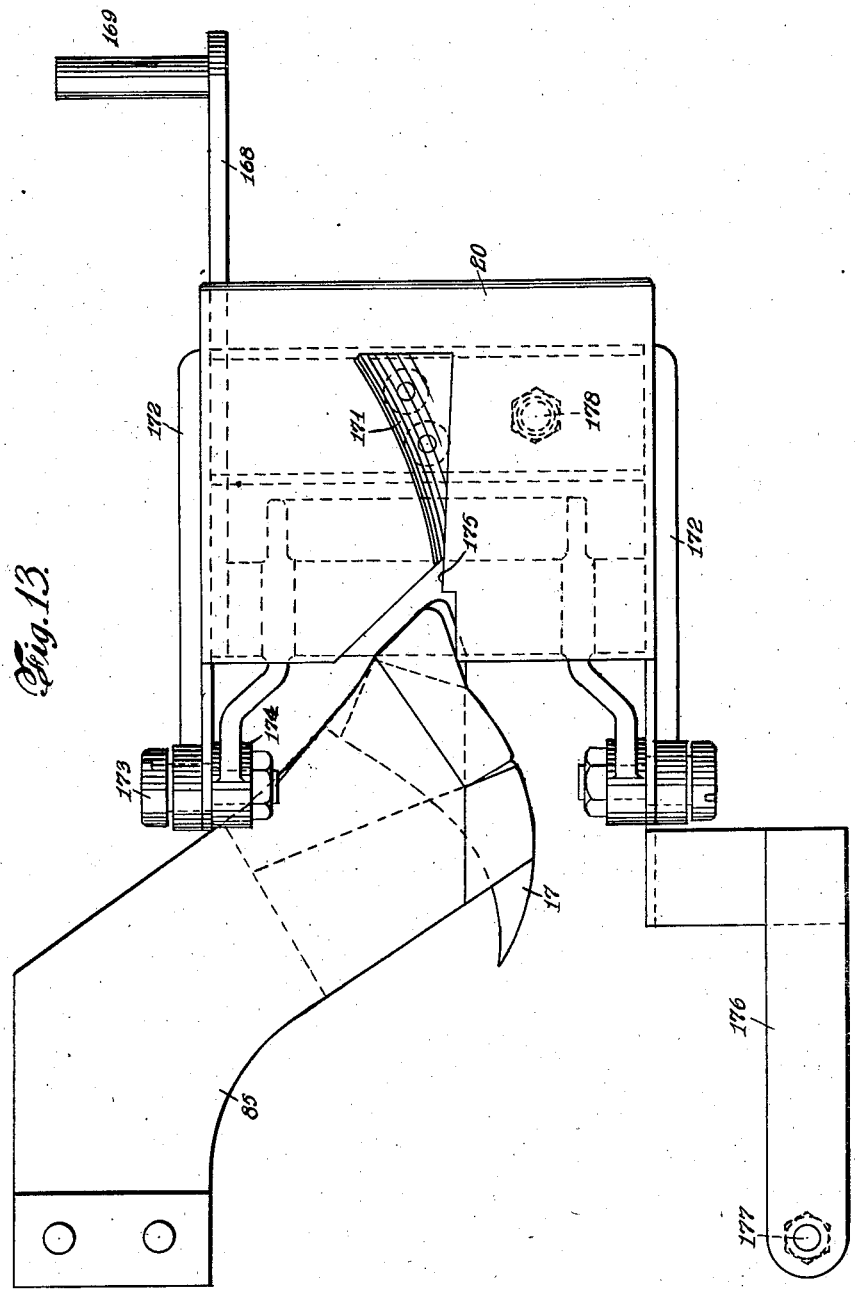
Figure 19:
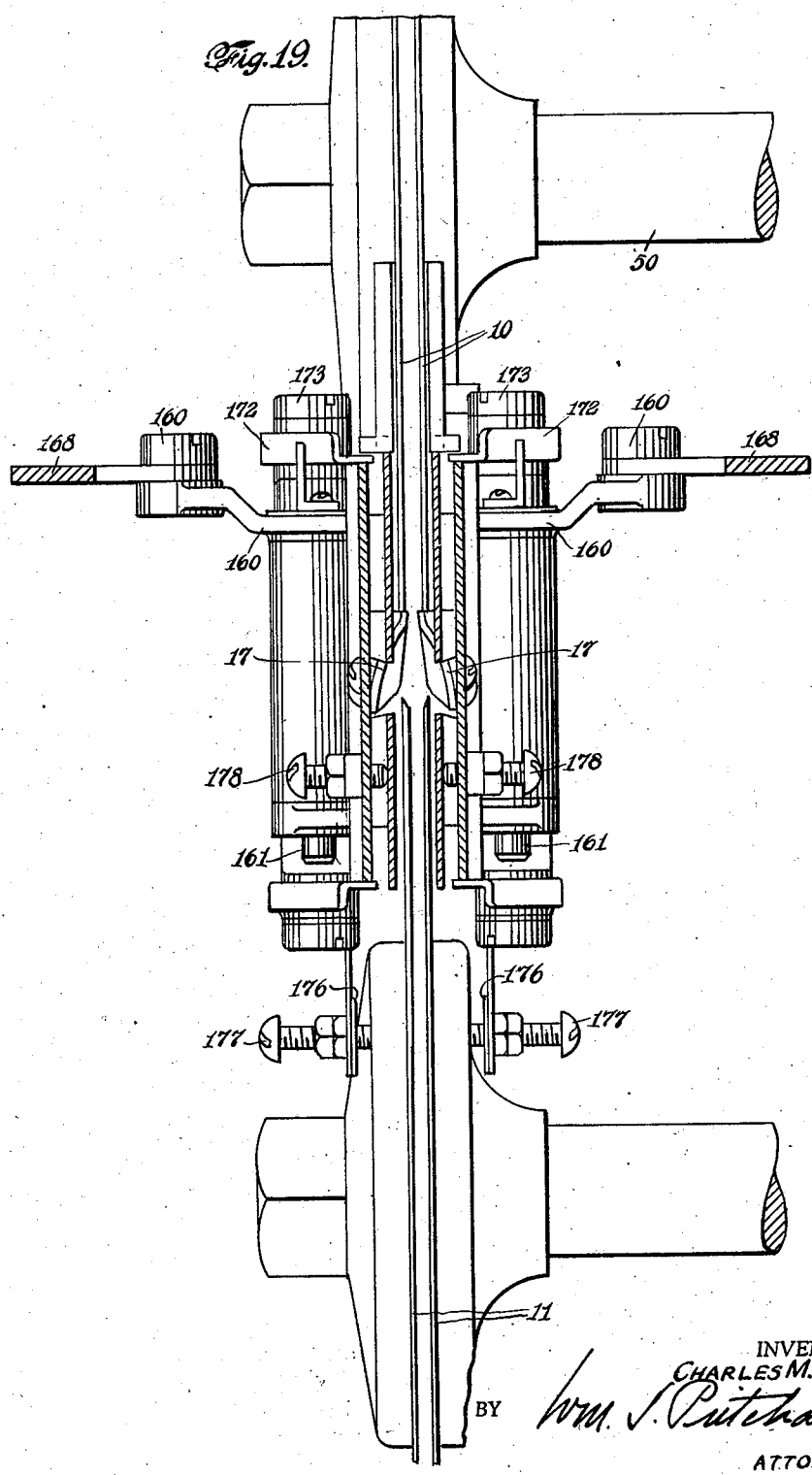
Figure 19 is a vertical section through the swivel guide.

In order to hold the fish in proper position with respect to the ribbing knives 18, a pair of hold-down plates 180 are provided (Figures 1, 6, 11, 20) which are pivotally mounted on brackets 181 attached to the frame by means of hinge pins 182, and are provided with adjustable stops comprising bolts 183 attached to the brackets 181 and bearing against shoulders 184 on lips 185 attached to the plates 180. The plates 180 are shaped at their inner ends (as shown in Figures 11 and 20) to provide upwardly extending lips 186 which facilitate the positioning and passage of the fish thereunder. The hold-down plates 180 are positioned in back of the upper and lower knives to engage the fish after it has passed the cutting station and while the fillet is being separated from the bones by means of the ribbing knives 18.

The combs 15 (Figures 2 and 7) are mounted on an arm 188 which is pivoted about a pin 189 held in a boss 190 attached to the bracket 79. The arm 188 is held downwardly by means of a spring stop 191 carrying an adjusting screw 192 (Figure 2) which bears against the bracket 79.

Operation

The operation of this machine will best be understood in connection with the passage of fish therethrough. The fish to be filleted are applied to the feed trough manually, tails first, and with their backs down. The feed trough is adapted to accurately center and position the fish and to feed the same to the cutting knives. The fish are advanced along the feed trough by a conveyor (not shown) and are supplied to the cutting knives from the end of the feed trough, shown at 14 in Figure 2. During the travel through the feed trough, the tail feathers and fins are used as centering guides. Throughout the travel of the fish past the cutting knives, the tail feathers are accurately positioned so as to pass between the knives and to thereby properly position the fish for filleting.

As each fish leaves the tilting trough 14, the pelvic fins are engaged by the combs 15 which are adapted to straighten out the fins, if the same should happen to be folded back, and to accurately position the fish. The combs 15 are mounted for pivotal movement about the pin 109 and are adapted to be raised by the fish as the latter passes thereunder. The combs 15 extend between the upper knives 10 and thereby insure that the tail feather passes between the knives and out of the path thereof, so that any crosscut or cutting of the tail feather or backbone of the fish is avoided. As the fish leaves the combs 15, it passes between the swivel guide plates 20, which are separated by the fish as it passes therethrough and operate in unison due to the segmental gears 23, so as to maintain the fish accurately centered and to feed the same to the knives in a position such that the respective knives of the upper and lower sets make incisions on opposite sides of the backbone but do not cut the backbone itself.

As each fish thus passes the knives, tail first, the tail guide 17 presses the body of the fish downwardly against the lower knives so as to cause the lower knives to make incisions which meet, or substantially meet, the incisions made by the upper knives, and thereby completely severs the flesh from the bone during this portion of the operation. In the event, however, that the flesh should not be completely severed, the ribbing knives 18, which enter the incisions made by the lower knives, serve to strip the flesh outwardly on both sides and therefore pull the same from the backbone and also guide the fillet away from the skeleton to drop into separate receptacles.

During the portion of the operation above described, the tail guide and the upper knives are held in their downward position by means of the latch 114. Referring to Figure 9, it will be noted that the latch 114 holds the arm 110 in its upper position, thereby causing the arm 106 to bear down against the upper knives, holding the same depressed. At the same time, the shaft 91, which is attached to the arm 106, is held at the limit of its counterclockwise movement and thereby holds downwardly the bracket 85, as shown in Figure 7, and the tail guide 17 which is carried by said bracket.

The cam 112 is so timed with respect to the conveyor, which feeds the fish to the machine that, during this portion of the travel of the fish, that is, while the tail portion is being cut by the upper and lower knives, the arm 110 has already been re-set by the cam 112, as shown in Figure 9, and has been latched. As the fish passes through the cutting knives, the cam 112 advances past the roller 111 and releases the same from the influence of the cam, so that the arm 110 is free to move when the latch 114 is released.

It is necessary to release the tail guide 17 and also to release the upper knives 10 before the ribs of the fish reach the cutting knives. This point, of course, depends somewhat upon the size of the fish and cannot be definitely set at any predetermined point with respect to the tail feather. In order to thus release the knives and tail guide at the proper time, the guide plates 20 and operating mechanism associated therewith have been provided. These guide plates, as previously pointed out, are pressed outwardly as the fish passes the cutting knives and accordingly assume a position corresponding to the width of the fish as it passes the cutting station. In order to accurately position the fish as the guide plates separate, the arms 21 and 168 are provided which are independently pivoted so as to cause the guide plates 20 to have a substantially parallel motion as they are separated by the fish. The segmental gears 23 cause the plates to move in unison so that in addition to having parallel motion the plates are always accurately centered with respect to the cutting knives.

In order to guide the tail feather of the fish between the cutting knives during the portion of the travel when the width of the fish is not sufficiently great to engage the plates 20, the auxiliary tail feather guides 171 are provided. These guides extend through the slots 175 (Figure 23) of the plates 20 and are positioned to be engaged by the thin tail feather as the fish reaches the cutting position. The guides 171 are pivoted about the pins 173 and are held inwardly by the light leaf springs 176 so that they are free to move outwardly in response to a relatively light pressure. Consequently, as the tail feather passes the guides 171 and the thicker tail portion of the fish reaches the plates 20, the guides 171 are forced outwardly and allow the tail portion of the fish itself to come in contact with said plates 20. Thereafter, the plates 20 are progressively forced outwardly as the fish passes therethrough and in so moving actuate the slide mechanism 25 (Figures 1, 6 and 9), causing this slide to move rearwardly or to the right, as shown in Figure 9, and thereby bringing the cam surface 144 of the cam segment 142 into engagement with the pin 145 and pushing the pawl 116 backwardly to release the latch 114.

The mechanism thus far described would operate satisfactorily if the fish were all of the same size, as the cam segment 142 can be set to release the latch 114 when the tail of the fish passing between the plates 20 has reached a predetermined thickness corresponding to the thickness of the fish as the rib portion is approached. However, it sometimes happens that a smaller fish may pass through the machine and, if the releasing mechanism were actuated as above described, the tail guide would not be released until some of the ribs had been severed by the cutting knives; or if the fish is sufficiently thin, the guide might not be released at all during the passage of the fish. In order to overcome this difficulty and adapt the machine to reasonable variations in fish sizes, the cam segment 142 is provided. This cam segment is continuously oscillated in a vertical plane by means of the link 151, which is actuated by the cam 157. The cam 157 is so timed with respect to the travel of the fish past the cutting knives that the cam segment 142 is at its upper position, as shown in Figure 9, at the beginning of the cutting operation and is lowered during the passage of the tail portion of the fish to the cutting knives. The cam surface 144 is arranged to progressively shift the arm 117 rearwardly as the cam segment is lowered. Consequently, the cam segment serves to release the latch 114, even though the fish is too small to actuate the slide 25 a sufficient distance for releasing the latch. The cam segment 142, however, is so designed that it will not of itself release the latch 114 unless the slide 25 has been pushed backwardly at least a slight amount by the passage of a fish. In other words, the latch is not released when no fish is passed through the machine but is released when a fish is in the cutting position regardless of the size of the fish, within of course the operating limits of the machine. In this way, the upper knives and the tail guide are released automatically in time to avoid cutting the ribs of the fish.

Thereafter, the tail guide is pulled upwardly by the springs 95 out of the path of the fish, and the upper knives are allowed to float under the tension of the spring 56. The fish accordingly takes a position when released by the tail guide such that the incisions made by the lower knives do not reach the ribs. During this portion of the cutting operation, the upper knives are in the belly cavity of the fish and accordingly need not be accurately positioned. During this portion of the operation, when the upper knives have been raised, the fish is held down against the lower knives by the hold-down plates 180.

As the fish continues to advance past the cutting knives, the ribbing knives 18 engage beneath the flesh and peel the same from the ribs of the fish. This serves to substantially remove the fillets from the fish. However, any remaining threads which are not completely severed by the above-mentioned mechanism are severed by the final cut-off knives 19, which are spaced apart a substantially greater distance than the knives 10 and 11, so as to clear the ribs which pass therebetween. The fillets are now completely severed from the carcass and fall into suitable receptacles on opposite sides of the machine, while the skeleton, with the tail feather and fins attached, passes to the rear of the machine between the cut-off knives 19.

While a specific embodiment of the invention has been shown and described, it is to be understood that the invention is not to be restricted thereto but is only to be limited in accordance with the scope of the following claims.

I claim:

1. In a fish filleting machine having upper and lower pairs of cutting knives to form incisions in the back and belly side of the fish on opposite sides of the backbone as the fish advances tail foremost and back downward past said knives, a tail guide, means to hold said tail guide in position to press the fish downwardly onto said lower knives to cause said lower knives to make incisions extending upwardly to substantially meet the incisions made by the upper knives for substantially completely severing the flesh from the backbone on each side, means to release the tail guide, and means to shift said tail guide out of the path of the fish as the ribs approach the knives, whereby the ribs pass between the pairs of knives without severance thereby.

2. In a fish filleting machine having upper and lower pairs of cutting knives to form incisions in the back and belly side of the fish on opposite sides of the backbone as the fish advances tail foremost and back downward past said knives, a tail guide, means to hold said tail guide in position to press the fish downwardly onto said lower knives to cause said lower knives to make incisions extending upwardly to substantially meet the incisions made by the upper knives for substantially completely severing the flesh from the backbone on each side, fish-actuated means to release the tail guide, and means to shift said tail guide out of the path of the fish as the fish advances toward a point such that the ribs approach the knives, whereby the ribs pass between the pairs of knives without severance thereby.

3. In a fish filleting machine having upper and lower pairs of cutting knives to form incisions in the back and belly side of the fish on opposite sides of the backbone as the fish advances tail foremost and back downward past said knives, a tail guide positioned to press the fish downwardly onto said lower knives to cause said lower knives to make incisions extending upwardly to substantially meet the incisions made by the upper knives for substantially completely severing the flesh from the backbone on each side, a bracket carrying said tail guide, means pivotally mounting said bracket for movement to shift said tail guide upwardly out of the path of the fish, means holding said bracket in lower position, means to release said holding means, and means to shift said bracket about said pivot for the above purpose in timed relationship to the advance of the fish past said knives, whereby the ribs are caused to pass between the pairs of knives without severance thereby.

4. In a fish filleting machine having upper and lower pairs of cutting knives to form incisions in the back and belly side of the fish on opposite sides of the backbone as the fish advances tail foremost and back downward past said knives, a tail guide positioned to press the fish downwardly onto said lower knives to cause said lower knives to make incisions extending upwardly to substantially meet the incisions made by the upper knives for substantially completely severing the flesh from the backbone on each side, a bracket carrying said tail guide, means pivotally mounting said bracket for movement to shift said tail guide upwardly out of the path of the fish, spring means urging said bracket upwardly, means latching said bracket in its lower position, and means actuated in timed relationship to the advancing fish past said knives to release said latching means, whereby the tail guide is moved upwardly by said spring means out of the path of the fish to permit the ribs to pass between the pairs of knives without severance thereby.

5. In a fish filleting machine having upper and lower pairs of cutting knives to form incisions in the back and belly side of the fish on opposite sides of the backbone as the fish advances tail foremost and back downward past said knives, a tail guide positioned to press the fish downwardly onto said lower knives to cause said lower knives to make incisions extending upwardly to substantially meet the incisions made by the upper knives for substantially completely severing the flesh from the backbone on each side, a bracket carrying said tail guide, means pivotally mounting said bracket for movement to shift said tail guide upwardly out of the path of the fish, spring means urging said bracket upwardly, means latching said bracket in its lower position, a pair of guide plates mounted to engage the sides of the fish at the cutting position and to be spread apart by the fish as the fish advances therebetween, and means actuated by movement of said plates to release said latching means, whereby the tail guide is moved upwardly by said spring means out of the path of the fish to permit the ribs to pass between the pairs of knives without severance thereby.

6. In a fish filleting machine having upper and lower pairs of cutting knives to form incisions in the back and belly side of the fish on opposite sides of the backbone as the fish advances tail foremost and back downward past said knives, a tail guide positioned to press the fish downwardly onto said lower knives to cause said lower knives to make incisions extending upwardly to substantially meet the incisions made by the upper knives for substantially completely severing the flesh from the backbone on each side, a bracket carrying said tail guide, means pivotally mounting said bracket for movement to shift said tail guide upwardly out of the path of the fish, spring means urging said bracket upwardly, means latching said bracket in its lower position, a pair of guide plates mounted to engage the sides of the fish at the cutting position and to be spread apart by the fish as the fish advances therebetween, timed means synchronized with the advance of the fish to said knives, and means actuated by the combined effect of the spreading movement of said plates and of said timed means to release said latching means, whereby the tail guide is moved upwardly by said spring means out of the path of the fish to permit the ribs to pass between the pairs of knives without severance thereby.

7. In a fish filleting machine having upper and lower pairs of cutting knives to form incisions in the back and belly side of the fish on opposite sides of the backbone as the fish advances tail foremost and back downward past said knives, means mounting said upper knives for vertical shifting, means holding said knives in a lower position to make incisions extending downwardly substantially to the backbone of the fish, means to release said holding means, and means to shift said released knives upwardly out of the path of the ribs as the ribs approach said knives, whereby the ribs pass between the pairs of knives without severance thereby.

8. In a fish filleting machine having upper and lower pairs of cutting knives to form incisions in the back and belly side of the fish on opposite sides of the backbone as the fish advances tail foremost and back downward past said knives, means mounting said upper knives for vertical shifting, means holding said knives in a lower position to make incisions extending downwardly substantially to the backbone of the fish, fish-actuated means to release said holding means, and means to shift said released knives upwardly out of the path of the ribs as the ribs approach said knives, whereby the ribs pass between the pairs of knives without severance thereby.

9. In a fish filleting machine having upper and lower pairs of cutting knives to form incisions in the back and belly side of the fish on opposite sides of the backbone as the fish advances tail foremost and back downward past said knives, means mounting said upper knives for vertical shifting, spring means urging said upper knives upwardly, means latching said knives in their lower position to make incisions extending substantially to the backbone of the fish, and means releasing said latching means as the ribs approach said knives, whereby said upper knives are moved upwardly to permit the ribs to pass thereunder without severance thereby.

10. In a fish filleting machine having upper and lower pairs of cutting knives to form incisions in the back and belly side of the fish on opposite sides of the backbone as the fish advances tail foremost and back downward past said knives, means mounting said upper knives for vertical shifting, spring means urging said upper knives upwardly, means latching said knives in their lower position to make incisions extending substantially to the backbone of the fish, and means actuated in timed relationship to the advancing fish past said knives to release said latching means, whereby the upper knives are moved upwardly by said spring means to permit the ribs to pass between the pairs of knives without severance thereby.

11. In a fish filleting machine having upper and lower pairs of cutting knives to form incisions in the back and belly side of the fish on opposite sides of the backbone as the fish advances tail foremost and back downward past said knives, means mounting said upper knives for vertical shifting, spring means urging said upper knives upwardly, means latching said knives in their lower position to make incisions extending substantially to the backbone of the fish, a pair of guide plates mounted to engage the sides of the fish at the cutting position and to be spread apart by the fish as the fish advances therebetween, and means actuated by movement of said plates to release said latching means, whereby the upper knives are moved upwardly by said spring means to permit the ribs to pass between the pairs of knives without severance thereby.

12. In a fish filleting machine having upper and lower pairs of cutting knives to form incisions in the back and belly side of the fish on opposite sides of the backbone as the fish advances tail foremost and back downward past said knives, means mounting said upper knives for vertical shifting, spring means urging said upper knives upwardly, means latching said knives in their lower position to make incisions extending substantially to the backbone of the fish, a pair of guide plates mounted to engage the sides of the fish at the cutting position and to be spread apart by the fish as the fish advances therebetween, timed means synchronized with the advance of the fish to said knives, and means actuated by the combined effect of the spreading movement of said plates and of said timed means to release said latching means, whereby the upper knives are moved upwardly by said spring means to permit the ribs to pass between the pairs of knives without severance thereby.

13. In a fish filleting machine having upper and lower pairs of cutting knives to form incisions in the back and belly side of the fish on opposite sides of the backbone as the fish advances tail foremost and back downward past said knives, means mounting said upper knives for vertical shifting between an upper position and a lower position, means holding said knives in said lower position to make incisions extending downwardly substantially to the backbone of the fish, a tail guide positioned to press the fish downwardly onto said lower knives to cause said knives to make an incision extending upwardly to substantially meet the incisions made by the upper knives, means to release said holding means, and means shifting both said upper knives and said tail guide to said upper position as the ribs approach said knives, whereby the ribs pass between said upper and lower knives without severance thereby.

14. In a fish filleting machine having upper and lower pairs of cutting knives to form incisions in the back and belly side of the fish on opposite sides of the backbone as the fish advances tail foremost and back downward past said knives, means mounting said upper knives for vertical shifting between an upper position and a lower position, means holding said knives in said lower position to make incisions extending downwardly substantially to the backbone of the fish, a tail guide positioned to press the fish downwardly onto said lower knives to cause said knives to make an incision extending upwardly to substantially meet the incisions made by the upper knives, means controlled in timed relationship to the advance of the fish to release said holding means, and means to shift both said upper knives and said tail guide to said upper position as the ribs approach said knives, whereby the ribs pass between said upper and lower knives without severance thereby.

15. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, means interrupting the operation of said severing means, latch means normally holding said interrupting means inoperative, a pair of guide plates positioned to engage and guide the fish between said knives, means mounting said guide plates for lateral movement in unison to be spread apart by the advancing fish, and means actuated in response to the spreading movement of said plates to release said latch means for interrupting the operation of said severing means as the ribs approach said knives.

16. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, timed means synchronized with the advance of the fish to said knives, and means actuated by the combined effect of said timed means and of the spreading movement of said plates to actuate said interrupting means.

17. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, a member reciprocated by the spreading movement of said plates, cam means on said member movable with respect thereto in timed relationship to the advance of the fish to said knives, and means engaged by said cam means to actuate said interrupting means.

18. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, a member reciprocated by the spreading movement of said plates, a reciprocating cam on said member reciprocated in timed relationship to the advance of fish to said knives, and means actuated by said cam to actuate said interrupting means.

19. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, means actuated in response to the spreading movement of said plates to actuate said interrupting means, and timed means to restore said severing means after passage of each fish.

20. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, timed means synchronized with the advance of the fish to said knives, means actuated by the combined effect of said timed means and of the spreading movement of said plates to actuate said interrupting means, and timed means to restore said severing means after passage of each fish.

21. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, a member reciprocated by the spreading movement of said plates, cam means on said member movable with respect thereto in timed relationship to the advance of the fish to said knives, means engaged by said cam means to actuate said interrupting means, and timed means to restore said severing means after passage of each fish.

22. In a fish filleting machine having upper and lower pairs of cutting knives to form incisions in the back and belly side of the fish on opposite sides of the backbone as the fish advances tail foremost and back downward past said knives, means severing the flesh on both sides from the backbone at the tail portion of the fish, and means interrupting the operation of said severing means as the ribs approach said knives to thereby prevent severing of the ribs, said last means comprising a pair of guide plates positioned to engage and guide the fish between said knives, means mounting said guide plates for lateral movement in unison to be spread apart by the advancing fish, a member reciprocated by the spreading movement of said plates, a reciprocating cam on said member reciprocated in timed relationship to the advance of fish to said knives, means actuated by said cam to actuate said interrupting means, and timed means to restore said severing means after passage of each fish.

23. In a fish filleting machine having upper and lower pairs of cutting knives to form incisions in the back and belly side of the fish on opposite sides of the backbone as the fish advances tail foremost and back downward past said knives, means mounting said upper knives for vertical shifting from a lower position suited to make an incision extending downwardly substantially to the backbone of the fish to an upper position out of the path of the ribs, a tail guide mounted to be shifted from a lower position suited to press the fish downwardly onto said lower knives to cause the same to make incisions substantially meeting the incisions of the upper knives to an upper position out of the path of the fish, spring means urging said upper knives and said tail guide to their upper positions, cam means actuated in timed relationship to the feed of the fish to the knives to restore said upper knives and said tail guide to their lower positions prior to passage of each fish, means latching the same in said lower position, and fish-actuated means to release said latching means as the ribs approach said knives.

24. In a fish filleting machine having upper and lower pairs of cutting knives to form incisions in the back and belly side of the fish on opposite sides of the backbone as the fish advances tail foremost and back downward past said knives, means mounting said upper knives for vertical shifting from a lower position suited to make an incision extending downwardly substantially to the backbone of the fish to an upper position out of the path of the ribs, a tail guide mounted to be shifted from a lower position suited to press the fish downwardly onto said lower knives to cause the same to make incisions substantially meeting the incisions of the upper knives to an upper position out of the path of the fish, spring means urging said upper knives and said tail guide to their upper positions, cam means actuated in timed relationship to the feed of the fish to the knives to restore said upper knives and said tail guide to their lower positions prior to passage of each fish, means latching the same in said lower position, and fish-actuated means to release said latching means as the ribs approach said knives, said last means comprising a pair of guide plates positioned to engage and guide the fish between said knives, means mounting said guide plates for lateral movement in unison to be spread apart by the advancing fish, and means actuated in response to the spreading movement of said plates to release said latching means.

25. In a fish filleting machine having upper and lower pairs of cutting knives to form incisions in the back and belly side of the fish on opposite sides of the backbone as the fish advances tail foremost and back downward past said knives, means mounting said upper knives for vertical shifting from a lower position suited to make an incision extending downwardly substantially to the backbone of the fish to an upper position out of the path of the ribs, a tail guide mounted to be shifted from a lower position suited to press the fish downwardly onto said lower knives to cause the same to make incisions substantially meeting the incisions of the upper knives to an upper position out of the path of the fish, spring means urging said upper knives and said tail guide to their upper positions, cam means actuated in timed relationship to the feed of the fish to the knives to restore said upper knives and said tail guide to their lower positions prior to passage of each fish, means latching the same in said lower position, and fish-actuated means to release said latching means as the ribs approach said knives, said last means comprising a pair of guide plates positioned to engage and guide the fish between said knives, means mounting said guide plates for lateral movement in unison to be spread apart by the advancing fish, a member reciprocated by the spreading movement of said plates, a reciprocating cam interposed between said member and said latching means to release said latching means in response to the combined effect of said member and said reciprocating cam, and means reciprocating said cam in timed relationship to the advance of the fish, said cam being adapted to release said latching means when said member is actuated only a slight amount in response to passage of a small fish which would not spread said plates a sufficient amount to otherwise release said latching means before the ribs reach said knives.

26. In a fish filleting machine having upper and lower pairs of cutting knives to form incisions in the back and belly side of the fish on opposite sides of the backbone as the fish advances tail foremost and back downward past said knives, centering and guide means comprising a pair of guide plates positioned to engage and guide the fish between said knives, means mounting said guide plates for lateral movement in unison to be spread apart by the advancing fish, means holding said plates substantially parallel during said lateral movement, and auxiliary guide means to engage and guide the tail feather between said knives, said auxiliary guide means being mounted on said first plates for independent pivotal movement.

27. In a fish filleting machine having upper and lower pairs of cutting knives to form incisions in the back and belly side of the fish on opposite sides of the backbone as the fish advances tail foremost and back downward past said knives, centering and guide means comprising a pair of guide plates positioned to engage and guide the fish between said knives, means mounting said guide plates for lateral movement in unison to be spread apart by the advancing fish, means holding said plates substantially parallel during said lateral movement, and auxiliary guide means to engage and guide the tail feather between said knives, said auxiliary guide means extending through apertures in said first plates and being mounted for independent pivotal movement as the tail feather passes therebetween.

28. In a fish filleting machine having upper and lower pairs of cutting knives to form incisions in the back and belly side of the fish on opposite sides of the backbone as the fish advances tail foremost and back downward past said knives, means mounting said upper knives for vertical shifting, means holding said knives in a lower position to make incisions extending downwardly substantially to the backbone of the fish, means to release said holding means, means to shift said knives upwardly out of the path of the ribs as the ribs approach said knives, whereby the ribs pass between the pairs of knives without severance thereby, and hold-down means to hold the fish against the lower knives after the upper knives have been elevated.

29. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, and means actuated in response to the spreading movement of said plates to release said holding means 30. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, timed means synchronized with the advance of the fish to said knives, and means actuated by the combined effect of said timed means and of the spreading movement of said plates to release said holding means.

31. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, a member reciprocated by the spreading movement of said plates, cam means on said member movable with respect thereto in timed relationship to the advance of the fish to said knives, and means engaged by said cam means to release said holding means.

32. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, a member reciprocated by the spreading movement of said plates, a reciprocating cam on said member reciprocated in timed relationship to the advance of the fish to said knives, and means actuated by said cam to release said holding means.

33. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, means actuated in response to the spreading movement of said plates to release said holding means, and timed means to restore said tail guide to the fish-pressing position after passage of each fish.

34. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, timed means synchronized with the advance of the fish to said knives, means actuated by the combined effect of said timed means and of the spreading movement of said plates to actuate said holding means, and timed means to restore said tail guide to the fish-pressing position after passage of each fish.

35. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, a member reciprocated by the spreading movement of said plates, cam means on said member movable with respect thereto in timed relationship to the advance of the fish to said knives, means engaged by said cam means to release said holding means, and timed means to restore said tail guide to fish-pressing position after passage of each fish.

36. In a fish filleting machine having upper and lower pairs of cutting knives to form incisions in the back and belly side of the fish on opposite sides of the backbone as the fish advances tail foremost and back downward past said knives, a tail guide, means urging said tail guide upwardly out of the path of travel of the fish, means to hold said tail guide in position to press the fish downwardly onto said lower knives to cause said lower knives to make incisions extending upwardly to substantially meet the incisions made by the upper knives for completely severing the fish from the backbone on each side, and fish-actuated means to release said holding means as the ribs approach said knives whereby the tail guide will be shifted out of the path of travel of the fish, said fish-actuated means comprising a pair of guide plates positioned to engage and guide the fish between said knives, means mounting said guide plates for lateral movement in unison to be spread apart by the advancing fish, a member reciprocated by the spreading movement of said plates, a reciprocating cam on said member reciprocated in timed relationship to the advance of the fish to said knives, means actuated by said cam to release said holding means, and timed means to restore said tail guide to fish-pressing position after passage of each fish.

CHARLES M. SAVRDA.